(12) United States Patent
Bugga et al.

(10) Patent No.: US 10,153,528 B2
(45) Date of Patent: Dec. 11, 2018

(54) METAL HYDRIDE-AIR (MH-AIR) BATTERY FOR LOW COST STORAGE APPLICATIONS

(71) Applicant: California Institute of Technology, Pasadena, CA (US)

(72) Inventors: Ratnakumar V. Bugga, Arcadia, CA (US); Andrew Kindler, San Marino, CA (US); Thomas I. Valdez, Covina, CA (US)

(73) Assignee: California Institute of Technology, Pasadena, CA (US)

( * ) Notice: Subject to any disclaimer, the term of this patent is extended or adjusted under 35 U.S.C. 154(b) by 628 days.

(21) Appl. No.: 14/641,168

(22) Filed: Mar. 6, 2015

(65) Prior Publication Data

US 2016/0248136 A1      Aug. 25, 2016

Related U.S. Application Data

(60) Provisional application No. 61/948,890, filed on Mar. 6, 2014.

(51) Int. Cl.
  *H01M 12/08* (2006.01)
  *H01M 4/38* (2006.01)
(52) U.S. Cl.
  CPC ........... *H01M 12/08* (2013.01); *H01M 4/383* (2013.01); *Y02E 60/128* (2013.01)
(58) Field of Classification Search
  CPC ...... H01M 12/08; H01M 4/383; H02J 7/0052; Y02E 60/128
  USPC ........................................................ 429/405
  See application file for complete search history.

(56) References Cited

U.S. PATENT DOCUMENTS

| 4,052,539 | A | 10/1977 | Shropshire et al. |
| 6,221,523 | B1 | 4/2001 | Chun et al. |
| 6,306,540 | B1 | 10/2001 | Hiroi et al. |
| 6,489,055 | B1 | 12/2002 | Ichihashi et al. |
| 6,852,446 | B2 | 2/2005 | Barbarich |
| 7,022,434 | B2 | 4/2006 | Iwakura et al. |
| 8,012,621 | B2 | 9/2011 | Joshi et al. |
| 2005/0202290 | A1* | 9/2005 | Merzougui ........... H01M 4/242 429/9 |
| 2011/0027666 | A1 | 2/2011 | Burchardt et al. |

(Continued)

FOREIGN PATENT DOCUMENTS

WO   WO 2012/174558 A1   12/2012
WO   WO 2014/099874 A1   6/2014

OTHER PUBLICATIONS

Bertoncello et al. (2000), "Preparation of anodes for oxygen evolution by electrodeposition of composite oxides of Pb and Ru on Ti." *J. Electroanal. Chem.*, 492, 145-149.

(Continued)

*Primary Examiner* — Gary D Harris
(74) *Attorney, Agent, or Firm* — Leydig, Voit & Mayer, Ltd.

(57) ABSTRACT

Metal hydride-air batteries and methods for their use are provided. An exemplary metal-hydride air battery includes an alkaline exchange membrane provided between the positive electrode and the negative electrode of the battery. The alkaline exchange membrane provides for transfer of hydroxide ions through the membrane. Optionally the alkaline exchange membrane limits transport of other species through the membrane.

13 Claims, 21 Drawing Sheets

(56) References Cited

U.S. PATENT DOCUMENTS

2012/0202099 A1 8/2012 Perry et al.
2015/0295290 A1* 10/2015 Young .................. H01M 12/08
429/405

OTHER PUBLICATIONS

Broom (2011), Hydrogen Storage Materials: The Characterisation of Their Storage Properties, Springer-Verlag, London, Green Energy and Technology, pp. 1-258.

Du et al. (Aug. 18, 2014), "Nonstoichiometric Perovskite CaMnO3-δ for Oxygen Electrocatalysis with High Activity," J. Inorg. Chem. 53:9106-9114.

Fujiwara et al. (2011), "Reversible air electrodes integrated with an anion-exchange membrane for secondary air batteries." J. Pow. Sources, 196(2), 808-813.

Gong et al. (Mar. 23, 2013) "An Advanced Ni—Fe Layered Double Hydroxide Electrocatalyst for Water Oxidation." J. Am. Chem. Soc., 135, 8452.

Inoue et al. (2012), "Charge—discharge performance of Cr-substituted V-based hydrogen storage alloy negative electrodes for use in nickel-metal hydride batteries." Electrochimica Acta 59, 23-31.

Iwakura et al. (2000), "Electrochemical and Structural Characterization of Ti—V—Ni Hydrogen Storage Alloys with BCC Structure." J. Electrochem. Soc., 147, 2503-2506.

Iwakura et al. (Oct. 1985), "Effect of Active Layer Composition on the Service Life of ($SnO_2$ and $RuO_2$)—Coated Ti Electrodes in Sulfuric Acid Solution." J. Electrochem. Soc., 132(10), 2420-2423.

Jung et al. (Mar. 28, 2014), "A Bifunctional Perovskite Catalyst for Oxygen Reduction and Evolution." J. Angew. Chem. 53, 4582.

Jung et al. (Nov. 20, 2014), "Fabrication of Ba0.5Sr0.5Co0.8Fe0.2O3—δ Catalysts with Enhanced Electrochemical Performance by Removing an Inherent Heterogeneous Surface Film Layer." J. Adv. Mater. 27, 266.

Kim et al. (Oct. 8, 2014), "$Ca_2Mn_2O_5$ as Oxygen-Deficient Perovskite Electrocatalyst for Oxygen Evolution Reaction," J. Am. Chem. Soc. 136:14646-14649.

Long et al. (Nov. 25, 2014), "Co intake mediated formation of ultrathin nanosheets of transition metal LDH—an advanced electrocatalyst for oxygen evolution reaction." Chem. Commun., 51, 1120.

Merle et al. (2011), "Anion exchange membranes for alkaline fuel cells: A review" J. Membrane Science, 377, 1-35.

Millet et al. (1989), "New solid polymer electrolyte composites for water electrolysis." J. App. Electrochem, 19, 162-166.

Musiani et al. (1999), "Electrodeposited $PbO_2+RuO_2$: a composite anode for oxygen evolution from sulphuric acid solution." J. Electroanal. Chem., 465, 160-167.

Ratnakumar et al. (1996), "Electrochemical Studies on $LaNi_{5-x}Sn_x$ Metal Hydride Alloys," J. Electrochem. Soc., 143(8), 2578-2584.

Sedlak et al. (1981), "Advances in oxygen evolution catalysis in solid polymer electrolyte water electrolysis." Int. J. Hydrogen Energy, 6, 159-165.

Seel et al. (2000), "Electrochemical Intercalation of PF 6 into Graphite." J. Electrochem. Soc. 147(3) 892-898.

Suntivich et al. (Dec. 2011), "A Perovskite Oxide Optimized for Oxygen Evolution Catalysis from Molecular Orbital Principles." Science, 334, 1383.

Suntivich et al. (Jun. 2011), "Design principles for oxygen-reduction activity on perovskite oxide catalysts for fuel cells and metal-air batteries." Nat. Chem. 3, 546.

Young et al. (2011), "Gas atomization of Cu-modified AB5 metal hydride alloys." J. of Alloys and Compounds 509: 4896-4904.

Yukawa et al. (2002), "Alloying effects on the hydriding properties of vanadium at low hydrogen pressures." J. Alloys and Compounds, 337, 264-268.

* cited by examiner

METAL HYDRIDE-AIR (MH-AIR) BATTERY FOR LOW COST STORAGE APPLICATIONS

CROSS-REFERENCE TO RELATED APPLICATIONS

This application claims the benefit of U.S. Provisional Application No. 61/948,890, filed Mar. 6, 2014 which is hereby incorporated by reference in its entirety.

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

BACKGROUND

Conventional hydride-based batteries provide a low-cost energy system. However, the energy density of these batteries can be relatively low. For example, state-of-the-art metal hydride batteries can provide an energy density of approximately of 60 Whr/kg.

Conventional nickel-metal hydride (MH) batteries include a positive electrode containing nickel hydroxide, a negative electrode containing a metal hydride, a separator between the positive and negative electrodes and an alkaline electrolyte. The electrolyte commonly includes an aqueous solution of potassium hydroxide. Charge and discharge reactions for nickel metal hydride batteries may be written as:

$$\text{Positive electrode: } Ni(OH)_2 + OH^- \rightarrow NiOOH + H_2O + e^- \text{ (charge)} \quad (1)$$

$$NiOOH + H_2O + e^- \rightarrow Ni(OH)_2 + OH \text{ (discharge)} \quad (2)$$

$$\text{Negative electrode: } M + H_2O + e^- \rightarrow MH_{ab} + OH^- \text{ (charge)} \quad (3)$$

$$MH_{ab} + OH^- \rightarrow M + H_2O + e^- \text{ (discharge)} \quad (4)$$

Where M is a hydrogen absorbing alloy and $H_{ab}$ is absorbed hydrogen.

Conventional separator materials for metal hydride batteries include woven or nonwoven fabrics of polymer fibers such as polyamide, polyolefin and nylon. Porous polymeric films are also used. U.S. Pat. No. 8,012,621 describes separators of alkali ion conductive solid electrolytes including solid Me SICON (Metal Super Ion CONducting material). U.S. Pat. No. 8,012,621 also describes alkali ion conducting, substantially nonporous polymer separators which include cation exchange membrane material made of a polymer with fixed anionic functional groups attached to a polymer backbone and alkali metal cations as mobile species.

BRIEF SUMMARY

In various aspects, the present invention provides metal hydride-air battery configurations, designs and methods. The high performance primary and secondary electrochemical cells provided by the invention enable a new battery platform capable of achieving useful performance attributes, such as higher energy densities than conventional state of the art metal hydride batteries. In an embodiment, metal hydride-air batteries of the present invention include an alkaline exchange membrane which provides facile transport of hydroxide ions while limiting transfer of oxygen molecules between the two electrodes, thereby allowing the replacement of expensive cathodes such as nickel hydroxide with air while maintaining high energy densities and cycle life. In another embodiment, a conventional separator may be used.

In one aspect, the present invention provides metal hydride-air batteries which exhibit high volumetric and gravimetric energy densities, good cycle life and useful discharge rate capabilities. The metal hydride-air batteries of the present invention are versatile and include primary and secondary batteries useful in a wide array of applications.

In an aspect, the invention provides a metal hydride-oxygen battery comprising: (i) a positive electrode comprising an electrocatalyst; (ii) a negative electrode comprising a hydrogen absorbing material; (iii) an electrolyte provided between said positive electrode and negative electrode, said electrolyte being capable of conducting hydroxide charge carriers; and (iv) an anion exchange membrane provided between said positive electrode and said negative electrode. In an embodiment, a source of $O_2$ is provided in contact with the electrocatalyst of the positive electrode. In an embodiment, the source of oxygen is air. In an embodiment, the hydrogen absorbing material is a metallic hydrogen storage alloy such as a metal hydride forming alloy. In an embodiment, the electrolyte is an alkaline aqueous electrolyte. In an embodiment, the electrolyte comprises a source of hydroxide in a concentration from 1 M to 10 M, 1M to 6M, or 2M to 6M. In an embodiment, the anion exchange material is an alkaline exchange membrane. In an embodiment, the alkaline exchange membrane comprises hydroxide (OH—) anions. In a further embodiment, said alkaline exchange membrane reversibly exchanges said hydroxide charge carriers and restricts transport of $O_2$ from said positive electrode to said negative electrode during charging or discharging of said battery.

In an embodiment, the invention provides a metal hydride-air battery comprising: (i) a positive electrode comprising an electrocatalyst; (ii) a negative electrode comprising a metallic hydrogen storage alloy; (iii) an electrolyte provided between said positive electrode and negative electrode, said electrolyte capable of conducting hydroxide charge carriers; and (iv) an alkaline exchange membrane provided between said positive electrode and said negative electrode; wherein the alkaline exchange membrane restricts transport of $O_2$ from the positive electrode to the negative electrode during the discharge of the battery. In an embodiment, a source of $O_2$ is provided in contact with the electrocatalyst of the positive electrode. In a further embodiment, said alkaline exchange membrane reversibly exchanges said hydroxide charge carriers and restricts transport of $O_2$ from said positive electrode to said negative electrode during charging or discharging of said battery.

The alkaline exchange membrane, also referred to as an alkaline anion exchange membrane, plays an important role in the novel metal hydride-air battery designs and configurations contained herein. First, the alkaline exchange membrane selectively allows the facile transport of hydroxide ions between the positive and negative electrodes, while limiting the transport of unwanted species which allows for high discharge rates while minimizing detrimental or disadvantageous reactions within cell. In embodiments, the membrane limits the transport of species including, but not limited to oxygen, carbon dioxide and water. For example, the alkaline exchange membrane in an embodiment limits cell dry-out. The alkaline exchange membrane further acts as a physical separator between the positive and negative electrodes. In an embodiment, the alkaline exchange membrane allows for an improved interface between the air electrode. In an embodiment, the alkaline exchange membrane allows the fabrication of free standing "thin-film-based" air electrode. The alkaline exchange membranes contained herein exhibit useful properties, for example, high electrical resistance, chemical stability, and high tensile strength.

In an embodiment, the alkaline exchange membrane comprises a polymer electrolyte. In an embodiment, for example, the alkaline exchange membrane comprises an ionomer. In embodiments, the ionic conductivity is greater than 9 mS/cm, from 9 mS/cm to 30 mS/cm, from 9 mS/cm to 50 mS/cm or from 9 mS/cm to 100 mS/cm, as measured at 25 degrees C. In embodiments, the ion exchange capacity is greater than 150 hydroxide ions/g, or from 150 to 400 hydroxide ions/g.

In an embodiment, for example, the alkaline exchange membrane is chemically stable for an electrolyte pH from 10 to 14. In an embodiment, for example, the alkaline exchange membrane is chemically inert with regards to reaction with one or more of $OH^-$, $H^+$, $CO_2$, $O_2$, $H_2O$.

In an embodiment, the alkaline exchange membrane is electrically insulating. In an embodiment, for example, alkaline exchange membrane undergoes self-cleaning upon charging of the battery.

The metal hydride-air batteries contained herein are versatile and can use a wide variety of metals acting as a hydrogen absorbing material and as a negative electrode. In an embodiment, for example, the hydrogen absorbing material is selected from the group consisting of an intermetallic compound or a solid solution alloy. In an embodiment, for example, the hydrogen absorbing material is an amorphous material. In an embodiment, for example, the negative electrode comprises a metal hydride with high reactivity. In embodiments, the hydrogen absorbing material is selected from the group consisting of an $AB_5$ intermetallic composition and an $AB_2$ intermetallic composition. In an embodiment, for example, the hydrogen absorbing material is provided in physical contact with the alkaline exchange membrane.

The metal hydride-air batteries of the present invention utilize molecular oxygen as the active material in the positive electrode. The present invention, advantageously, may use a variety of electrocatalysts including bifunctional catalysts to facilitate the reaction of the air positive electrode. In embodiments, for example, the electrocatalyst has a composition selected from the group consisting of $Pt—IrO_2$, perovskite, ruthenium oxide, manganese oxide, iridium oxide, nickel oxide, lead oxide and combinations of these. In an embodiment, for example, the electrocatalyst is a bifunctional electrocatalyst. In a further embodiment, the battery comprises a first electrocatalyst which is one of an oxygen reduction reaction catalyst and an oxygen evolution catalyst and a second electrocatalyst which is the other of an oxygen reduction reaction catalyst and an oxygen evolution catalyst. In an embodiment, for example, a source of $O_2$ is provided in contact with the positive electrode and the source of $O_2$ is air. In an embodiment, for example, the electrocatalyst is provided in physical contact with the alkaline exchange membrane. In an embodiment, for example, the alkaline exchange membrane functions as a substrate to support the electrocatalyst of the positive electrode.

A variety of different electrolytes and electrolyte formulations are suitable for use with the present invention. In an embodiment, for example, the said electrolyte is an aqueous alkaline electrolyte. In embodiments, the electrolyte comprises a source of hydroxide ion dissolved in a solvent, said source of hydroxide ion selected from the group consisting of KOH, NaOH and any combination of these. In an embodiment, for example, the said source of hydroxide ion has a concentration in said solvent selected from the range 1 M to 6 M. In embodiments, the electrolyte further comprises one more additives. In an embodiment, for example, the electrolyte has a pH greater than or equal to 10. In an embodiment for example, the alkaline exchange membrane limits transport of the aqueous component of said electrolyte, thereby decreasing the rate of loss of the aqueous component by evaporation.

Advantageously, the metal hydride-air batteries of the present invention provide increased energy density and cycle life. In embodiments the metal hydride-air battery has a gravimetric energy density greater than 150 Whr/kg, from 100 Whr/kg to 250 Whr/kg or from 150 Whr/kg to 250 Whr/kg. In embodiments the metal hydride-air battery has a volumetric energy density greater than 300 Whr/l, from 250 Whr/l to 450 Whr/l, or from 300 Whr/l to 450 Whr/l. In an embodiment, for example, the metal hydride-air battery has a cycle life greater than or equal to 300 cycles. In an embodiment, for example, the metal hydride-air battery comprises a closed system.

In another aspect, the present invention includes a method for generating current, the method comprising: (i) providing a metal hydride battery comprising: a positive air electrode comprising an electrocatalyst in contact with a source of $O_2$; a negative electrode comprising an metal hydride active material; an electrolyte provided between the positive electrode and negative electrode, the electrolyte capable of conducting hydroxide charge carriers; and an alkaline exchange membrane provided between the positive electrode and the negative electrode; wherein the alkaline exchange membrane restricts transport of $O_2$ from the positive electrode to the negative electrode during discharging of the battery; and (ii) discharging the battery thereby generating electrical current.

In another aspect, the present invention includes a method for storing electrical current, the method comprising: (i) providing a metal hydride battery comprising: a positive air electrode comprising an electrocatalyst; a negative electrode comprising a hydrogen absorbing material, the hydrogen absorbing material comprising a metal; an electrolyte provided between the positive electrode and negative electrode, the electrolyte capable of conducting hydroxide charge carriers; and an alkaline exchange membrane provided between the positive electrode and the negative electrode; wherein the alkaline exchange membrane restricts transport of $O_2$ from the positive electrode to the negative electrode during charging of the battery; and (ii) charging the battery by flowing current into the battery thereby storing the current as chemical energy.

BRIEF DESCRIPTION OF THE DRAWINGS

FIG. 1A: Discharge. FIG. 1B: Charge.

FIG. 1C: Discharge. FIG. 1D: Charge.

DETAILED DESCRIPTION

Figure 1A:
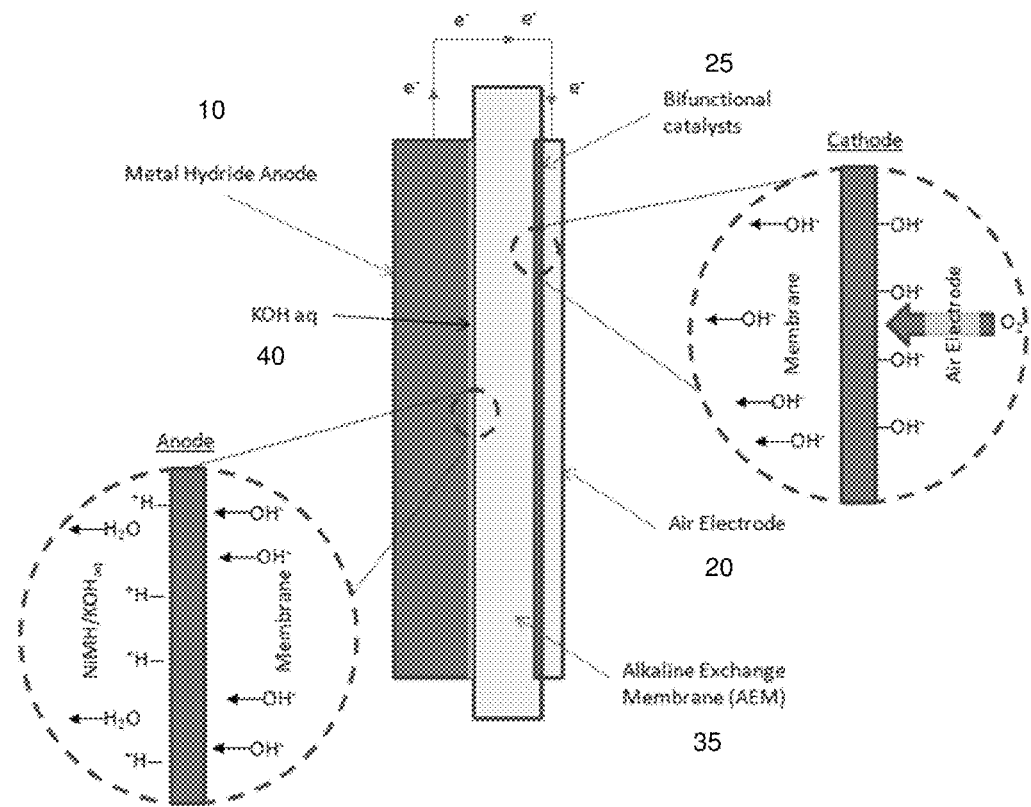
FIGS. 1A-1B. Functional schematics of a MH-Air battery with a bifunctional catalyst.

In general the terms and phrases used herein have their art-recognized meaning, which can be found by reference to standard texts, journal references and contexts known to those skilled in the art. The following definitions are provided to clarify their specific use in the context of the invention.

Referring to the drawings, like numerals indicate like elements and the same number appearing in more than one drawing refers to the same element. In addition, hereinafter, the following definitions apply:

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. In certain embodiments, the term electrochemical cell includes fuel cells, supercapacitors, capacitors, flow batteries, metal-air batteries and semi-solid batteries. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$.

The term "discharge rate" refers to the current at which an electrochemical cell is discharged. Discharge rate can be expressed in units of ampere. Alternatively, discharge rate can be normalized to the rated capacity of the electrochemical cell, and expressed as C/(X t), wherein C is the capacity of the electrochemical cell, X is a variable and t is a specified unit of time, as used herein, equal to 1 hour.

"Current density" refers to the current flowing per unit electrode area.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprise a conductive diluent, such as acetylene black, carbon black, powdered graphite, coke, carbon fiber, graphene, and metallic powder, and/or may further comprises a binder, such as a polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052,539, 6,306,540, and 6,852,446. For some embodiments, the electrode is typically fabricated by depositing a slurry of the electrode material, an electronically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma).

"Standard electrode potential" (E°) refers to the electrode potential when concentrations of solutes are 1M, the gas pressures are 1 atm and the temperature is 25 degrees Celsius. As used herein standard electrode potentials are measured relative to a standard hydrogen electrode.

"Active material" refers to the material in an electrode that takes part in electrochemical reactions which store and/or deliver energy in an electrochemical cell.

"Cation" refers to a positively charged ion, and "anion" refers to a negatively charged ion.

"Electrical contact," "electrical communication", "electronic contact" and "electronic communication" refer to the arrangement of one or more objects such that an electric current efficiently flows from one object to another. For example, in some embodiments, two objects having an electrical resistance between them less than 100Ω are considered in electrical communication with one another. An electrical contact can also refer to a component of a device or object used for establishing electrical communication with external devices or circuits, for example an electrical interconnection. "Electrical communication" also refers to the ability of two or more materials and/or structures that are capable of transferring charge between them, such as in the form of the transfer of electrons. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components.

"Electrical conductivity" or "electrically conductive" refers to transfer of charges which can be ionic (ions) or electronic (electrons). "Electronic conductivity" or "electronically conductive" refers to transfer of charges which are electronic (electrons). "Ionic conductivity" or "ionically conductive" refers to transport of ionic charge carriers.

"Thermal contact" and "thermal communication" are used synonymously and refer to an orientation or position of elements or materials, such as a current collector or heat transfer rod and a heat sink or a heat source, such that there is more efficient transfer of heat between the two elements than if they were thermally isolated or thermally insulated. Elements or materials may be considered in thermal communication or contact if heat is transported between them more quickly than if they were thermally isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another are separated from each other by a thermally conductive material or intermediate thermally conductive material or device component.

In some embodiments, elements in thermal communication with one another are separated by a distance of 1 μm or less. In some embodiments, elements in thermal communication with one another are provided in physical contact.

"Chemically resistant" refers a property of components, such as layers, of separators and electrochemical systems of the invention wherein there is no significant chemical or electrochemical reactions with the cell active materials, such as electrodes and electrolytes. In certain embodiments, chemically resistant also refers to a property wherein the tensile retention and elongation retention is at least 90% in the working environment of an electrochemical system, such as an electrochemical cell.

"Thermally stable" refers a property of components, such as layers, of separators and electrochemical systems of the invention wherein there is no significant chemical or electrochemical reactions due to normal and operational thermal behavior of the cell. In certain embodiments, thermally stable also refers to materials wherein the melting point is more than 100 Celsius, and preferably for some embodiments more than 300 Celsius, and optionally the coefficient of thermal expansion is less than 50 ppm/Celsius. In an embodiment, thermally stable refers to a property of a component of the separator system such that it may perform in a rechargeable electrochemical cell without undergoing a change size or shape with the temperature that significantly degrades the performance of the electrochemical cell.

"Porosity" refers to the amount of a material or component that corresponds to pores, such as apertures, channels, voids, etc. Porosity may be expressed as the percentage of the volume of a material, structure or device component, such as a high mechanical strength layer, that corresponds to pores, such as apertures, channels, voids, etc., relative to the total volume occupied by the material, structure or device component.

As used herein, an ion exchange process involves reversible exchange of ions in solution with ions held by a solid ion-exchanging material. Ion-exchange or ionogenic groups confer the ion-exchange property to the material. As used herein, an ion-exchange membrane is a membrane comprising ion-exchange groups. Parameters used to characterize ion-exchange membranes include the ion exchange capacity, the ion transport number and the ionic conductivity. For a polymeric ion-exchange membrane, the ion exchange capacity may be defined by the moles of ionic groups per unit mass of dry polymer. The ion transport number quantifies the amount of charge that is transported through the ion exchange membrane by that ion.

An anion exchange membrane comprises anion exchange groups. Anion exchange groups include cationic groups. Cationic groups include, but are not limited to groups such as quaternary ammonium, phosphonium or imidizalium groups. A quaternary ammonium group may be described by the formula $—R_1R_2R_3N^+$, where R1, R2 and R3 are individually alkyl or aryl. A phosphonium group may be described by the formula $—R_1R_2R_3P^+$ where R1, R2 and R3 are individually alkyl or aryl. In an embodiment the cationic group is an ethyl imidazolium group. In an embodiment, the polymeric anionic-exchange membrane includes cationic groups bound to the polymer backbone and mobile anions. In an embodiment, the polymeric anion-exchange membrane is a alkaline anion exchange membrane comprising alkaline anions. An alkaline anion exchange membrane is also referred to herein as an alkaline exchange membrane. In an embodiment, a hydroxide ion conducting anion exchange membrane comprises mobile (OH)— ions. For a polymeric anion-exchange membrane, the ion exchange capacity (IEC) may be determined by the number of moles of cationic groups per unit mass of dry polymer.

In an embodiment, the anionic exchange membrane is a homogeneous membrane. In an embodiment, the anionic exchange membrane is a polymer electrolyte membrane. In an embodiment, polymer electrolyte is a polyelectrolyte comprising ionic groups. In an embodiment, the polyelectrolyte is an ionomer. In an embodiment, an ionomer is a copolymer comprising nonionic repeat units and ion containing repeat units. In an embodiment, the ionic groups located upon nonpolar backbone chains. In an embodiment, the amount of ionic groups is 1 mol % to 15 mol %. In embodiments, the anionic exchange membrane is nonporous or is substantially nonporous. In an embodiment, a substantially nonporous contains no pores which extend through the membrane.

A variety of methods are known to the art for producing homogeneous anionic exchange membranes. One group of methods involves polymerization or polycondensation of a monomer containing an anionic exchange group or a moiety that can be turned into an anionic exchange group; these monomers can be copolymerized with a monomers which do not contain an anionic exchange group. Another group of methods involves introduction of an anionic exchange group on preformed films. A third group of methods involves introduction of anionic exchange groups by chemical modification into a polymer (or polymer blend) followed by dissolution of the polymer and casting it into a film (Merle et al., J. Membrane Science, 377, 2011, 1-35, hereby incorporated by reference for its description of anion exchange membranes). In an embodiment, a membrane in salt form is alkalinized (e.g. by treatment with KOH) to yield a hydroxide conducting membrane.

Alkaline exchange membranes have been in development for fuel cells over the past several years and more recently been used in water electrolysis. Fumatech and Tokuyama are manufacturers providing commercially available membranes. In an embodiment, the membrane is a Fumatech Fumasep® FAA membrane, such as FAA-3-PK-130. In another embodiment, the membrane is a Tokuyama 201 or 901 membrane. In another embodiment, the membrane is a Polyethersulfone (PES)-ethyl imidazolium membrane. For fuel cell and water electrolysis use, the membranes are typically operated in saturated or flooded configurations. In an embodiment, alkaline exchange membranes used in metal hydride-air cells are also operated in saturated or flooded configurations and subjected to high concentrations of potassium hydroxide (for example, approximately 6M) to optimize the metal hydride performance. The chemical stability of polymeric anion exchange membranes under alkaline conditions is influenced by the chemical stability of the cationic group.

The positive electrode may be termed an oxygen electrode or an air electrode. During discharge of the cell, hydroxide ions are generated through dissociation of oxygen and water at the surface of the oxygen or air electrode. During recharging of the cell, water dissociates to hydroxide and oxygen at the air or oxygen electrode. U.S. Pat. No. 6,221,523 is hereby incorporated by reference for its description of oxygen and air electrodes and catalyst deposition methods.

Catalysts suitable for use with the positive electrode include metals, metal alloys, metal oxides and metal complexes. In an embodiment, a single catalyst is suitable for both reduction of oxygen (during discharge) and evolution of oxygen (during charging). Such a catalyst may be termed a bifunctional catalyst. Bifunctional catalysts known to the art include noble metal thin films, perovskites, and a spinel oxides. Perovskite-type oxides include transition metal oxides represented by the general composition formula $ABO_3$. One class of perovskite-type oxide is $LaCoO_3$, partial substitution products in which La is partially substituted by one or more of Ca, Sr or Ba, partial substitution products in which Co is partially substituted by one or more Mn, Ni, Cu, Fe, Ir, and substitution products in which both La and Co are partially substituted.

In a further embodiment, a first catalyst is used for oxygen reduction and a second catalyst used for oxygen evolution. Suitable oxygen reduction reaction (ORR) catalysts include, but are not limited to, metals. Metal ORR catalysts include platinum-group metals such as ruthenium, rhodium, palladium, osmium, iridium, and platinum. Suitable oxygen evolution reaction (OER) catalysts include, but are not limited to metals and metal oxides. Metal OER catalysts include platinum-group metals such as ruthenium, rhodium, palladium, osmium, iridium, and platinum. Metal oxide OER catalysts for use with alkaline solutions include ruthenium oxide, manganese oxide, iridium oxide, nickel oxide, and lead oxide. The first and second catalyst may be present on the same positive electrode or on separate electrodes. In an embodiment where separate electrodes are provided (dual electrode configuration), one electrode is used for oxygen evolution and the other electrode for oxygen reduction.

Figure 5:
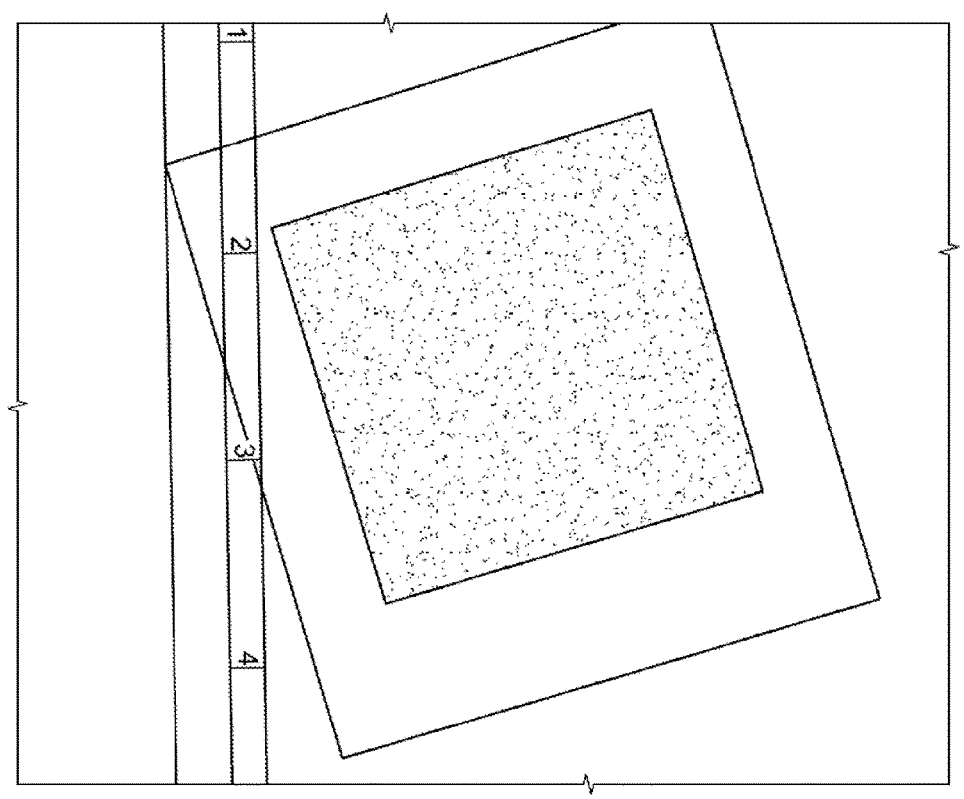
FIG. 5. Fabrication of a "free standing" air electrode.

In an embodiment, the positive electrode or cathode structure can be fabricated by "direct deposition" techniques on an alkaline exchange membrane (AEM). FIG. 5. Illustrates fabrication of a "free standing" air electrode. In an embodiment, the air electrode of the metal hydride air battery is fabricated in part by mixing a catalyst with the alkaline exchange membrane ionomer. The ionomer-catalyst mixture is then bonded to the alkaline exchange membrane.

In an embodiment, the negative electrode comprises hydrogen absorbing material comprising a metal. In an embodiment, when the battery is charged, the hydrogen absorbing material takes the form of a metal hydride. During discharge, the hydrogen absorbing material (e.g. metal hydride) reacts with hydroxide ions generated at the positive electrode to form water. During recharging, hydrogen is generated at the negative electrode and stored in the hydrogen absorbing material (e.g. as a metal hydride). In an embodiment, the negative electrode is referred to as a metal hydride electrode whether or not it is in the charged or discharged state.

A variety of hydrogen storage materials are known to the art (D. P, Broom, *Hydrogen Storage Materials*, 2011, Springer-Verlag, London hereby incorporated by reference for its description of hydrogen storage materials). In an embodiment, the hydrogen absorbing material is a intermetallic compound. The intermetallic compound may be formed from two metallic components A and B. Different stoichiometries include $AB_5$, $A_2B_7$, $AB_3$, $AB_2$, AB and $A_2B$. The components A and B can be fully or partly substituted with other elements of similar size or chemistry. Alloys which do not form intermetallic compounds are also useful for hydrogen storage; these alloys include solid solution alloys. In an embodiment, the hydrogen storage material includes an A component and a B component with the general stoichiometry $AB_5$. In an embodiment, the A component is selected from mischmetal, La, Ce, Ti and combinations thereof and the B component is selected from Ni, Co, Mn, Al and combinations thereof. In an embodiment, the hydrogen storage material includes a rare earth element in the A component and nickel in the B component with the general stoichiometry $AB_5$. In an embodiment, the rare earth element is La, Ce, Pr, Nd or a combination of two or more of these elements. In an embodiment, the hydrogen storage material includes an A component and a B component with the general stoichiometry $AB_2$. In an embodiment, the A component is selected from V, Ti and combinations thereof and the B component is selected from Zr, Ni, Cr, Co, Fe, Mn and combinations thereof.

Metal hydride electrodes may be fabricated by mixing the hydrogen absorbing material with other components. In an embodiment, the mixture comprises about 75% of $AB_5$ material, 20% Ni powder and 5% Teflon emulsion (Ratnakumar et al., J. Electrochem. Soc., 143(1006), 2578-2584, hereby incorporated by reference in its entirety for its description of electrode compositions and fabrication methods).

Aqueous alkaline solutions suitable for use as an electrolyte in the present invention include, but are not limited to, aqueous solutions comprising an alkali metal hydroxide. In an embodiment, the alkali metal hydroxide is potassium hydroxide (KOH) or sodium hydroxide (NaOH).

The invention may be further understood by the following non-limiting examples

EXAMPLE 1

Metal Hydride-Air Cell Configurations and Modeling

Cell Configurations

Figure 1B:
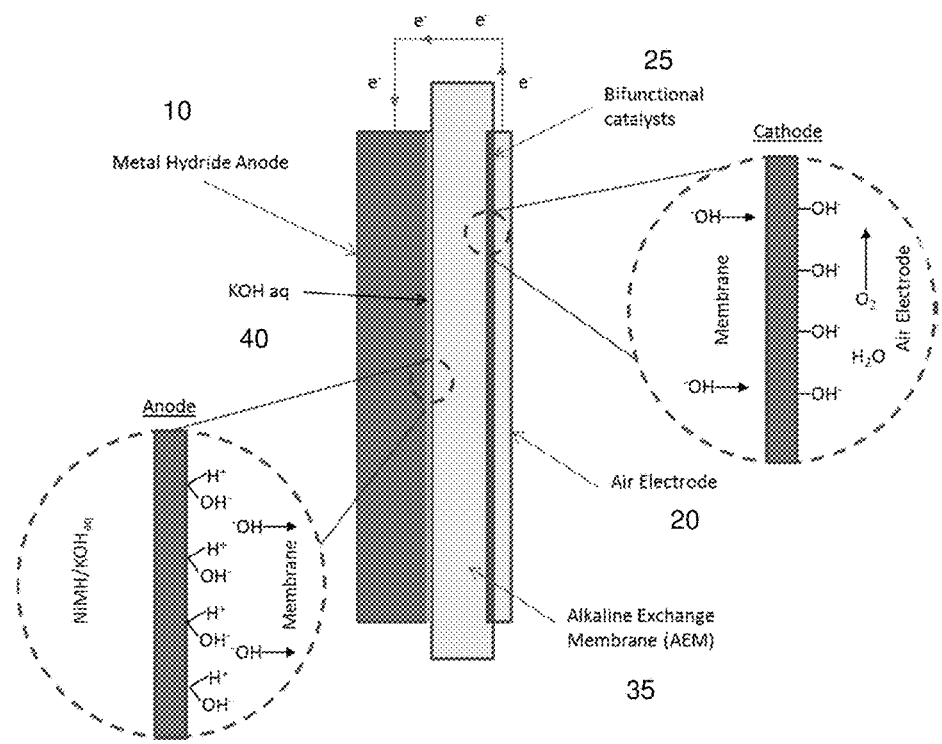

An exemplary metal hydride-air battery is comprised of a metal hydride (MH) anode, an alkaline exchange membrane, and an air electrode, as illustrated schematically in FIGS. 1A and 1B. FIG. 1A shows discharge, while FIG. 1B shows charge. Power is drawn from the system by discharging the metal hydride material (anode) 10. As the metal hydride material is discharged, it reacts with hydroxide ions generated at the air electrode (cathode) 20 to form water, as illustrated in the inset to the left of the FIG. 1A. The hydroxide ions are generated through the dissociation of oxygen and water at the surface of the air electrode as illustrated by the insert to the right of the FIG. 1A. In FIG. 1A, the bifunctional catalyst is indicated by reference label 25 and the aqueous electrolyte by reference label 40.

The electrochemical reactions are reversible and thus the metal hydride-air battery can be recharged by supplying current to cell, as shown in FIG. 1B. When the cell is recharged, hydroxide diffuses through the membrane. Water is consumed from the anode compartment. The hydroxide then conducts to the metal hydride anode to form hydrogen. Hydrogen is stored in the metal hydride. In an embodiment, transport of hydroxide back through the membrane provides a cleaning mechanism for the cell.

The alkaline exchange membrane 35 serves as a barrier to oxygen (from air) reacting with the metal hydride as well as limits evaporation of aqueous electrolyte from the metal hydride (anode) compartment to the environment. The alkaline membrane also facilitates the storage of water in the metal hydride compartment that is produced during discharge and is required for recharging the system. The alkaline membrane works in conjunction with an ionomer to minimize the interfacial resistance between the membrane and the air electrode. The air electrode of the metal hydride air battery is fabricated in part by mixing a catalyst with the alkaline exchange membrane ionomer. The ionomer-catalyst mixture is then bonded to the alkaline exchange membrane. Thus the function of the alkaline exchange membrane is to serve as both a separating barrier as well as the substrate for air electrode fabrication.

The configuration shown in FIGS. 1A and 1B ("bifunctional air electrode configuration") uses a bifunctional air electrode with both ORR and OER functionality. An alternate configuration (referred to herein as "dual air electrode configuration") employs three electrodes, including MH electrode, ORR electrode and OER electrode. We note that ORR and OER electrodes may have different structural requirements, such as optimized triple phase boundary (oxygen/electrolyte/catalyst) for the former and two phase interface (water/catalyst) for the latter, and also different material requirements, particularly with non-precious metal catalysts and catalyst supports having asymmetric activity and stability when employed for ORR vs. OER. Consequently, it is conceivable that optimal MH-air cell cost and performance will be achieved using a dual air electrode configuration.

Figure 1C:
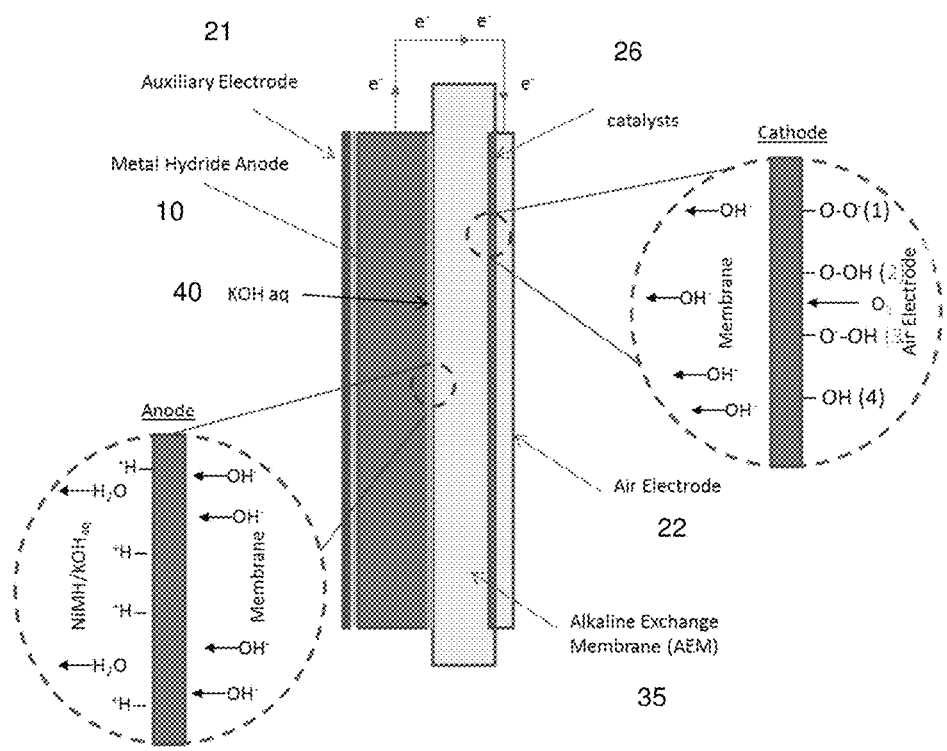
FIGS. 1C-1D. Functional schematics of a MH-Air battery with a dual electrode configuration catalyst.
Figure 1D:
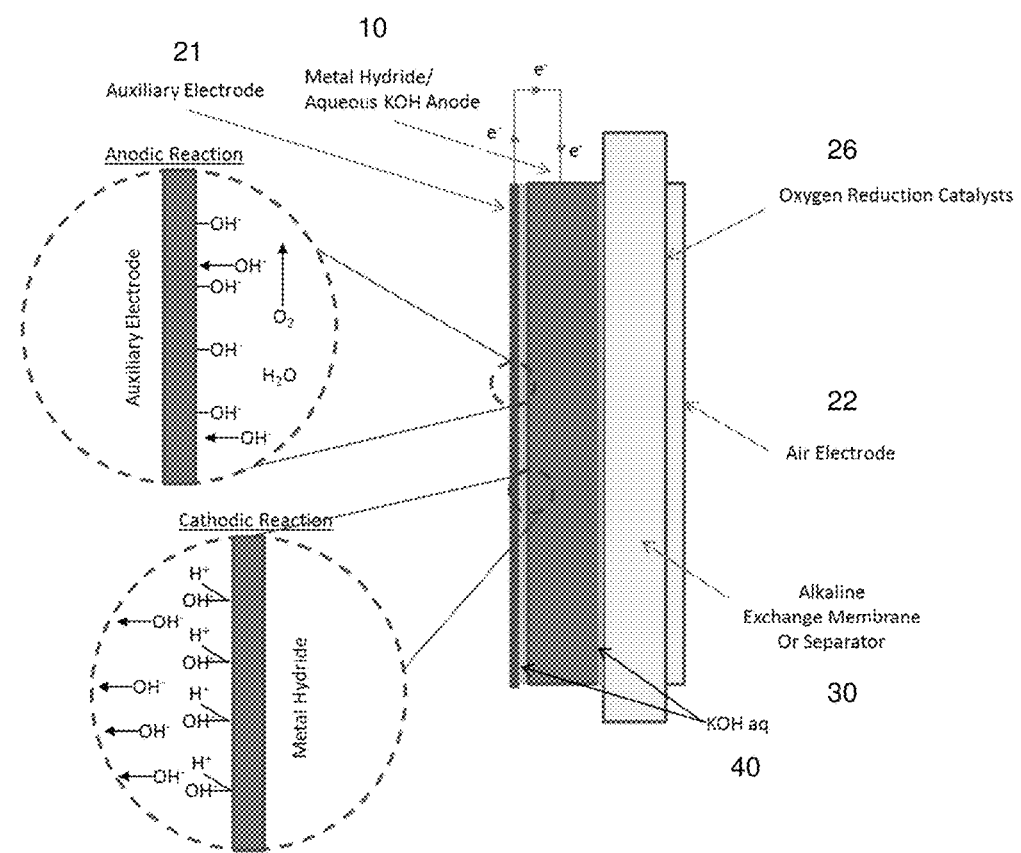

FIGS. 1C and 1D show functional schematics of a MH-Air battery with a dual electrode configuration. FIG. 1C shows discharge, while FIG. 1D shows charge. In the configuration shown in FIGS. 1C and 1D, the auxiliary electrode 21 and the ORR electrode 22 (also an air electrode) are on different sides of the MH electrode. The oxygen reduction catalyst is indicated by reference label 26. In FIG. 1D, the separator is indicated as being an alkaline exchange membrane or separator and has been denoted by label 30.

Figures 2A, 2B:
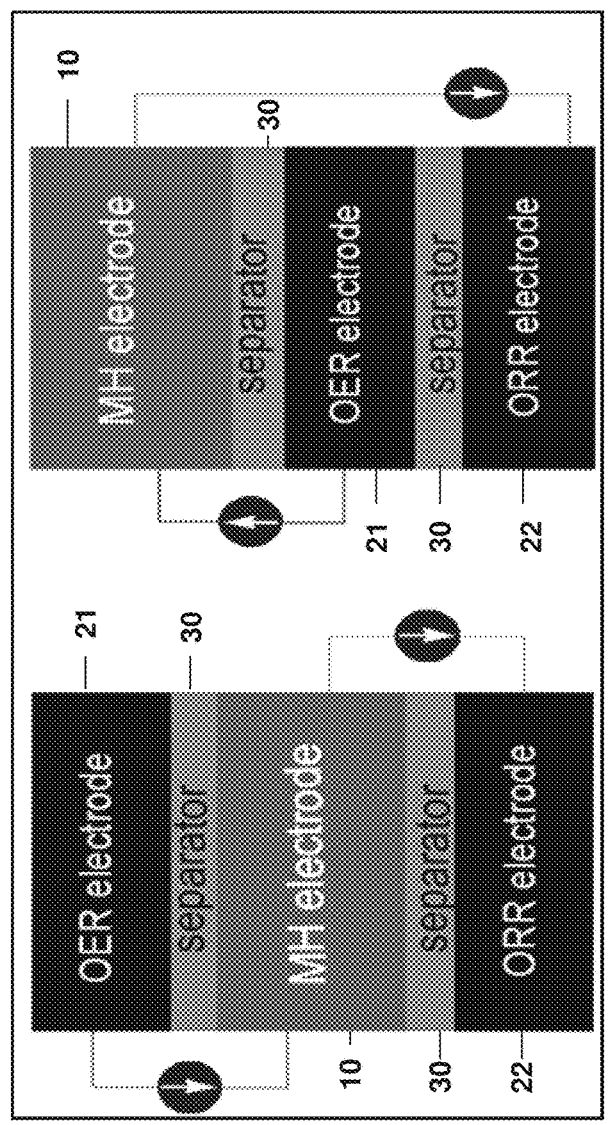
FIGS. 2a-2b. Two different possible arrangements of a prismatic MH-air cell with a dual air electrode configuration are illustrated in (FIG. 2a) and (FIG. 2b).

Two different possible arrangements of a prismatic MH-air cell with a dual air electrode configuration are illustrated in FIG. 2a and FIG. 2b. In the configuration shown in FIG. 2b, the OER electrode 21 and the ORR electrodes 22 are on different sides of the MH electrode, with a separator 30 placed between the MH electrode and each of the air electrodes. In the configuration shown in FIG. 2a, the OER electrode is separated from the MH electrode by a separator, with the ORR electrode being separated from the OER electrode by another separator. In an embodiment, the separator comprises an alkaline exchange membrane. In a further embodiment, a conventional separator is used during testing of electrode configurations Modeling Performance metrics and milestones for each cell component were established based on a model of a 5 Ah MH-air cell which incorporated various cell design parameters including MH alloy capacity, anode loading, separator porosity and thickness, electrolyte volume and the dimensions of the cell container.

Figure 3A:
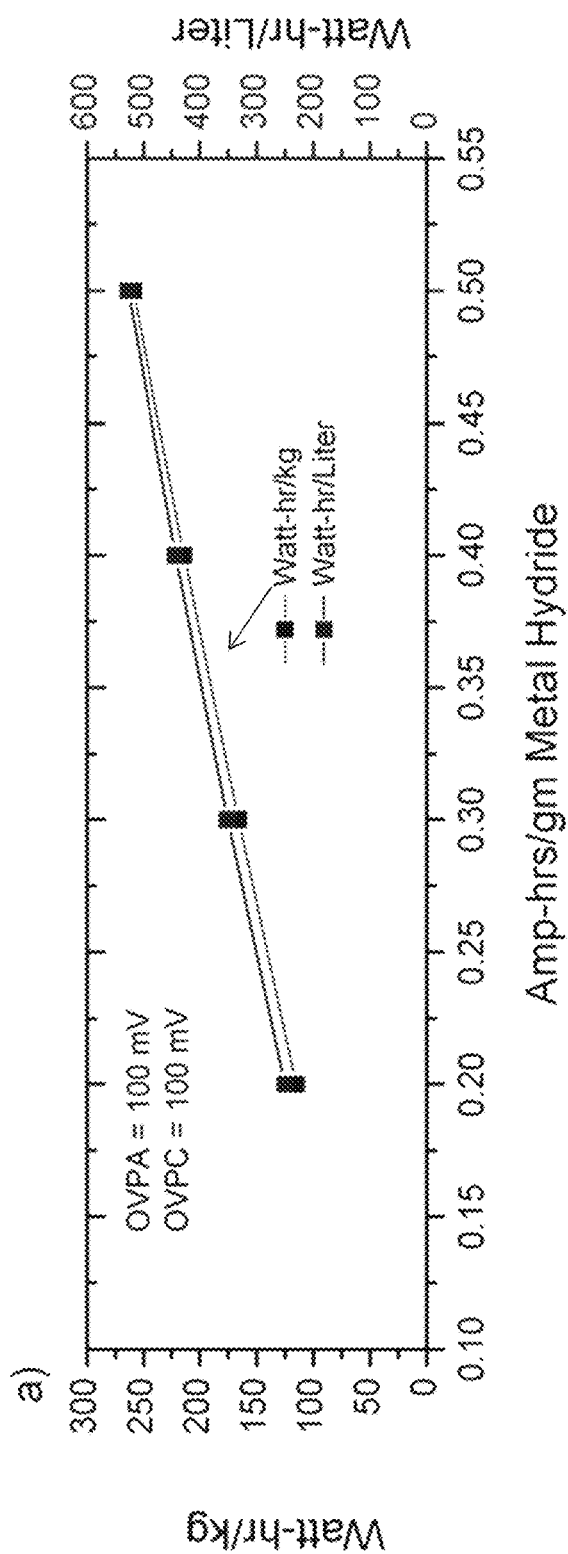
FIGS. 3a-3b. Projected energy densities vs. anode capacity and air electrode overpotential at 59 mA/cm² (FIG. 3a) and 172 mA/cm² (FIG. 3b).
Figure 3B:
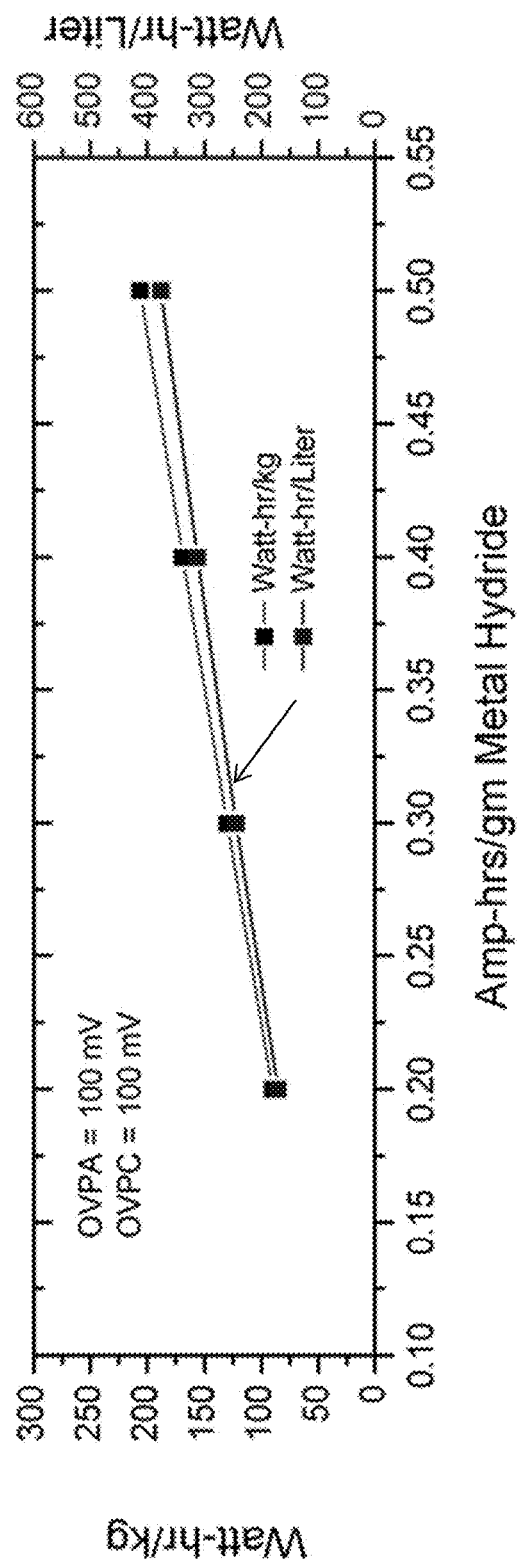

Using this model, the specific energy and energy density of the 5 Ah MH-air cell were projected as a function of MH anode specific capacity and overpotential of the oxygen electrode at different current densities. As shown in FIGS. 3a and 3b it is possible to achieve a specific energy and energy density of 200 Wh/kg and 400 Wh/l, respectively, with anode capacity of 400 mAh/g and cathode overpotential of 100 mV at 59 mA/cm$^2$. Alternately, these high energy densities are possible with improved cathode kinetics, i.e., with overpotential of 100 mV at 172 mA/cm$^2$ and a lower anode specific capacity of 300 mAh/g. In FIG. 3a, the upper set of data points gives the volumetric energy density while in FIG. 3b the lower set of data points gives the volumetric energy density.

In summary, the model illustrates the importance of the metal hydride capacity and oxygen electrode kinetics as well as the interrelationship of these performance metrics for achieving high specific energy and energy density in a MH-air cell.

EXAMPLE 2

Fabrication of "Free Standing" Air Electrodes

A cathode structure can be fabricated by "direct deposition" techniques on an AEM. An AEM with a "free-standing" air electrode is shown in FIG. 5. The electrode area for this cell is 25 cm$^2$ and is designed to operate in conjunction with a MH with a capacity of approximately 350 to 700 mAhr.

EXAMPLE 3

MH-Dual Air Electrode-Non-AEM Separator Test Cell and Test Results

Figure 6:
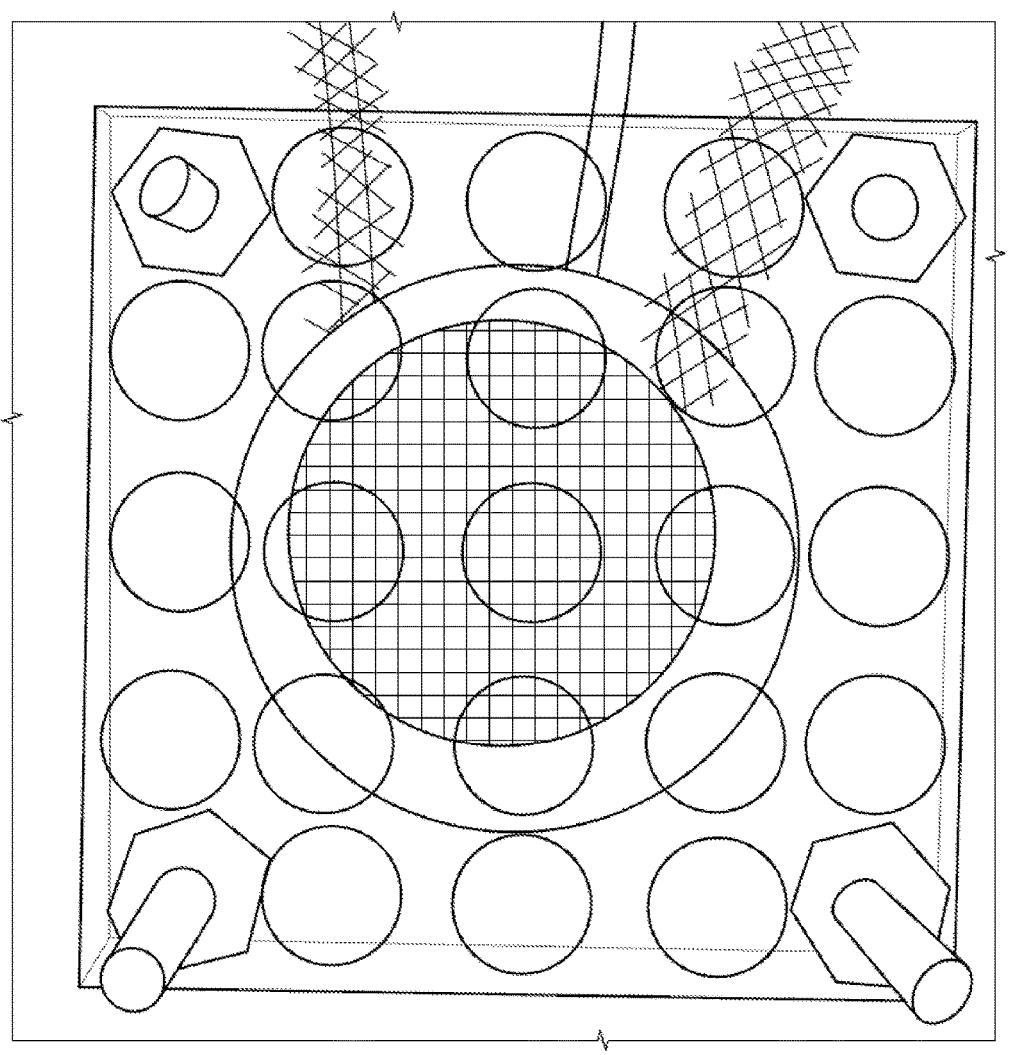
FIG. 6. MH-air cell test fixture with PMMA plates.

A MH-air cell test fixture (FIG. 6) used for cycling studies consists of two square (25 cm$^2$) poly(methyl methacrylate) porous plates securing a cell via four corner screws tightened with a torque wrench to provide defined, uniform stack pressure. We have found this simple design is also versatile, since it allows different prismatic arrangements of ORR, OER and MH electrodes and can be operated under ambient air or housed in a secondary containment vessel providing controlled environmental parameters (e.g. temperature, humidity, partial pressures of $O_2$, $CO_2$, $N_2$ etc.) and supporting additional analytics (e.g. mass spectrometry, pressure analysis etc.).

MH-air cells were assembled in the configuration shown in FIG. 2a and consisted of the following components: 1) MH negative electrode comprising $AB_5$ alloy ($LaNi_5$ based with partial substitution, BASF), Ni powder (<1 μm, Sigma Aldrich) and PTFE (60% emulsion in $H_2O$, Sigma Aldrich) in 75:20:5 wt % ratio pressed on Ni mesh (Dexmet) at 12 tons/cm$^2$ for 10 minutes; 2) Monel alloy OER electrode (200 mesh, McMaster-Carr); 3) Commercial ORR electrode ($MnO_2$ catalyst on carbon black with PTFE hydrophobic layer, Electric Fuel Corporation); 4) 5.33 M KOH electrolyte impregnated in two polyamide separators.

A custom testing methodology was developed using a Bio-Logic VMP3 potentiostat and EC Lab software allowing synchronous cycling with two working electrodes (ORR and OER electrodes) connected to a single MH counter electrode. The cycling protocol included charging with the OER electrode at C/1.5 (based on MH capacity determined in half cell experiments and equal to 23.36 mA/cm$^2$ of MH surface area) and discharging with the ORR electrode at C/3 (11.68 mA/cm$^2$). The cell is deliberately undercharged to a capacity limit equal to 94% of the MH electrode capacity measured in half cell experiments and discharged to a voltage limit of 0.5 V under ambient air.

Figure 7:
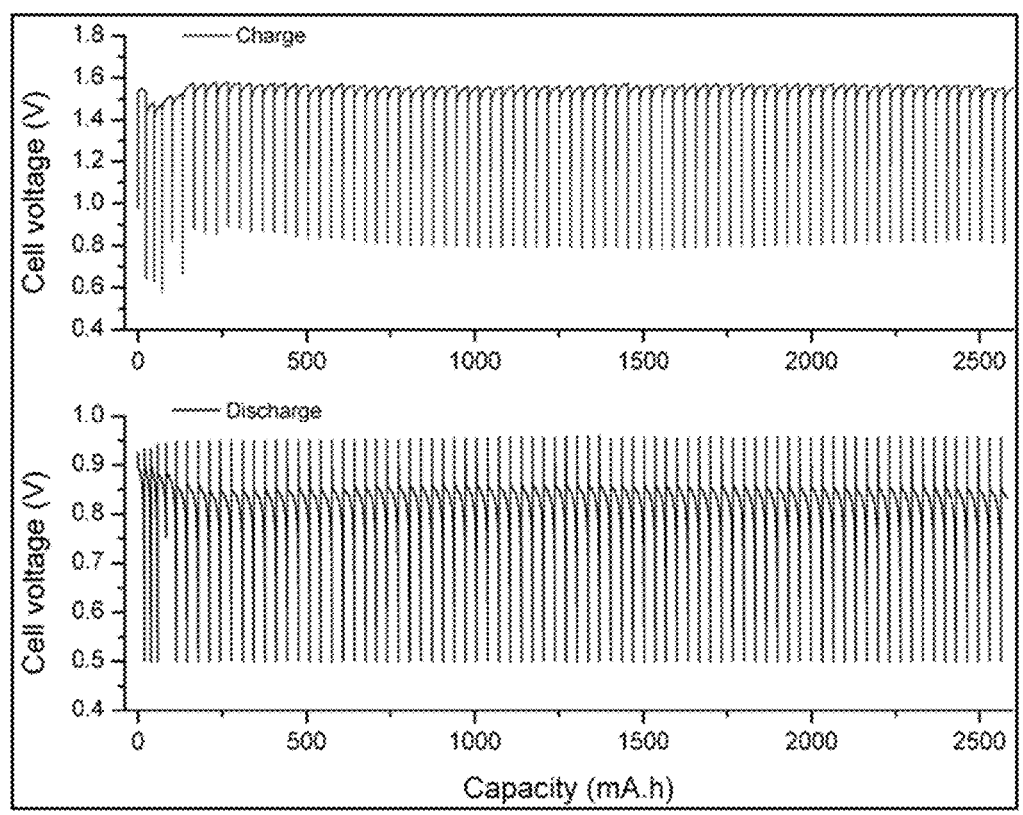
FIG. 7. Voltage vs. capacity plots of long term cycling in a MH-air cell (charge and discharge profiles shown separately, with charge profile in upper portion of figure).
Figure 8A:
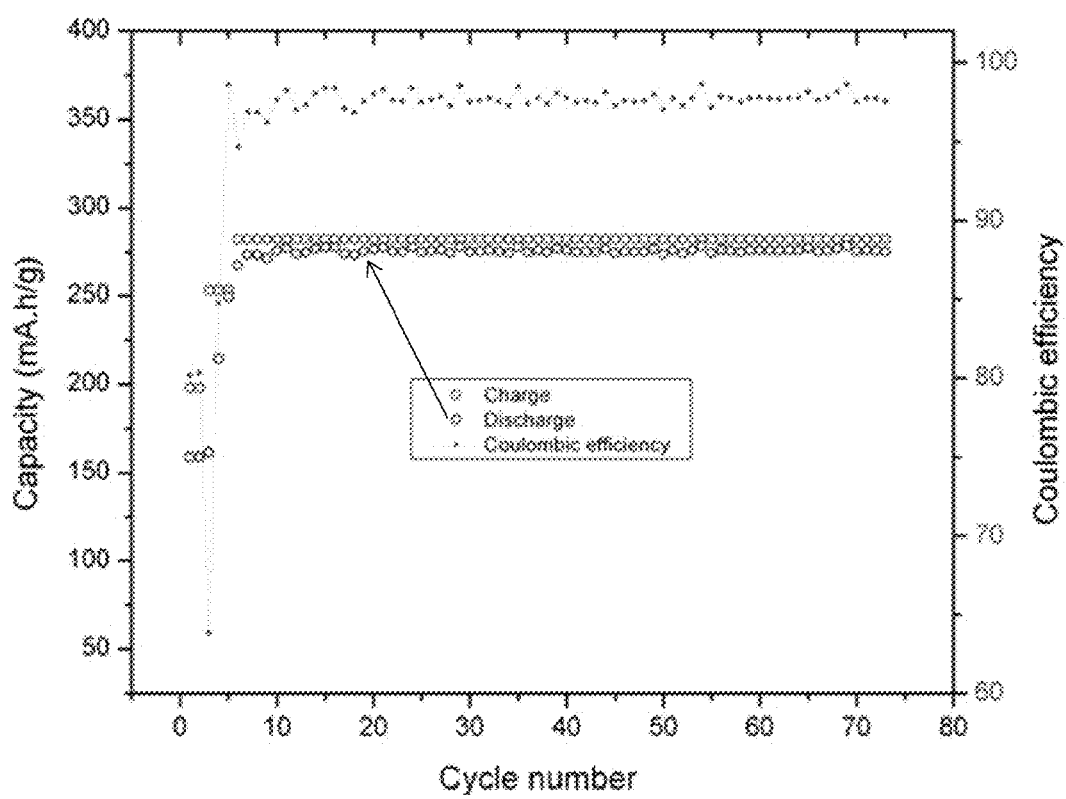
FIGS. 8a-8b Plot of capacities and coulombic efficiency vs. cycle number (FIG. 8a) and voltage profiles (FIG. 8b) for a MH-air cell.
Figure 8B:
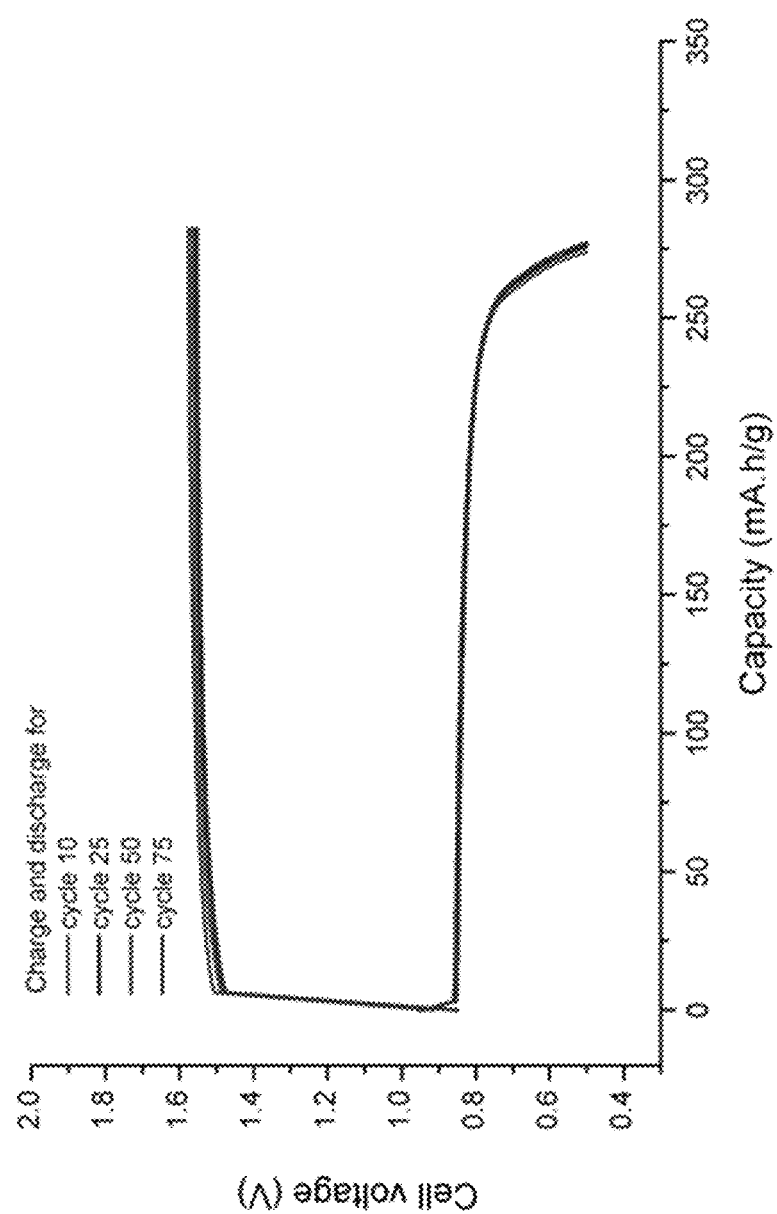

As is shown in FIGS. 7, 8a and 8b, this cell and testing protocol was found empirically to enable excellent capacity retention and coulombic efficiency. While 100 cycles are not shown in FIG. 8a, the cell is still cycling and at the time of submission has achieved >95% capacity retention (~275 mAh/g) after >80 cycles. FIG. 8b plots voltage vs. total capacity (charging and discharging on separate graphs) for >450 hours of cycling. Similarly, FIG. 8a plots capacities and coulombic efficiency as a function of cycle number. Note that lower current densities were applied during the first 8 cycles, which led to somewhat lower coulombic efficiency. Remarkably consistent voltage profiles are obtained, as shown in FIG. 8b, with low overpotential discharges at 0.85 V and charges at ~1.55 V. While the charging overpotential is undesirably high, we note that the monel mesh OER electrode is low cost and structurally unoptimized, with relatively low surface area.

Optimal water management is significant challenge identified in cycling studies. To achieve long term cycling, a large excess of electrolyte was used. In a practical system, the electrolyte volume will be controlled within a narrow range such that electrodes are sufficiently wet to operate efficiency while the mass of water is small enough to still achieve targets in specific energy and energy density.

EXAMPLE 4

Additional MH-Dual Air Electrode-Non-AEM Separator Test Cell and Test Results

Figure 9:
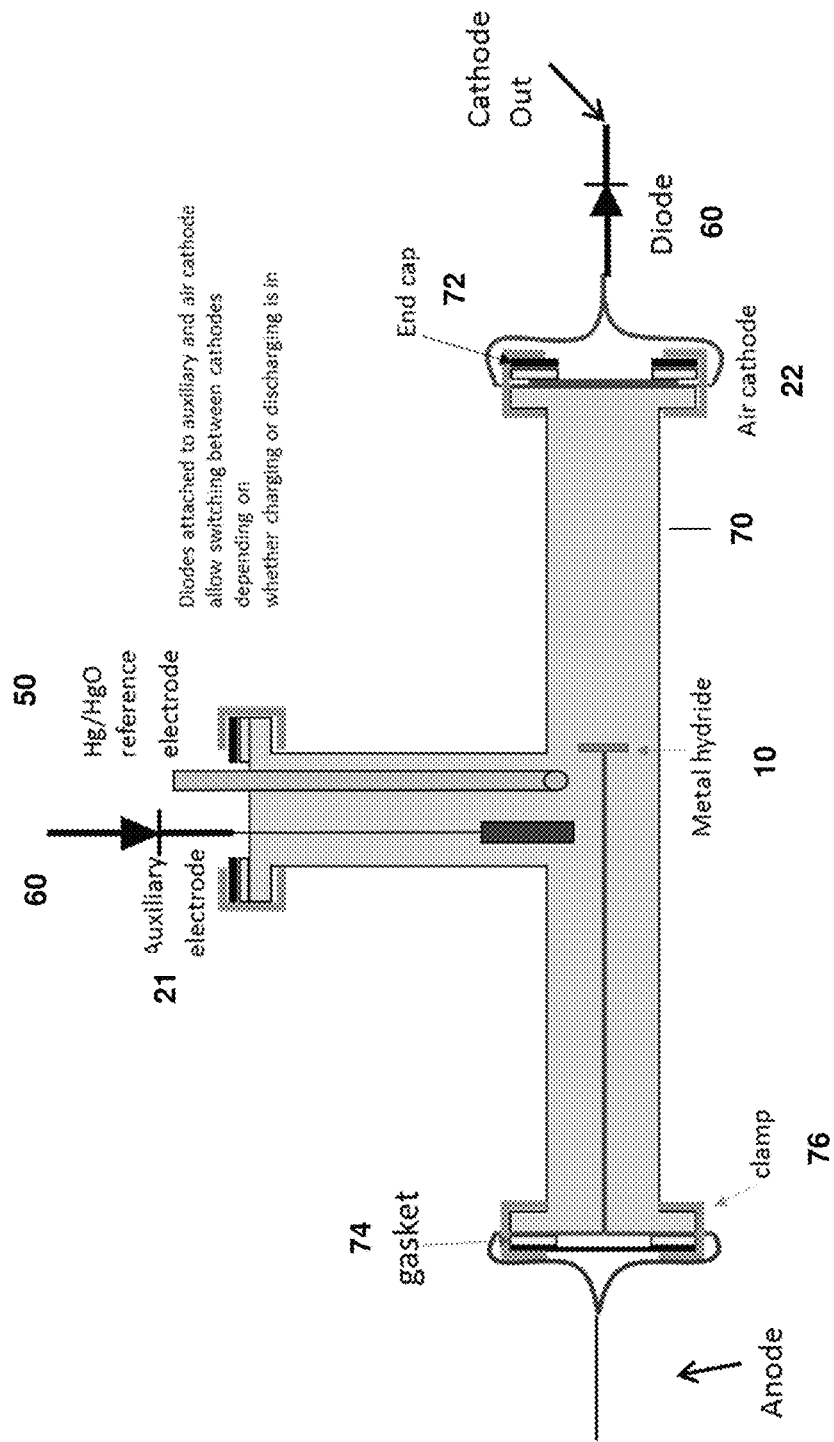
FIG. 9. Schematic of MH-air cell.

The cell design that we have implemented makes use of commercial polypropylene components. It is designed to limit (but not eliminate) access of oxygen and $CO_2$. It is provided with the means to hold the three cell electrodes as well as a commercial Hg/HgO reference electrode. A schematic illustration of the cell is shown in FIG. 9. As shown in FIG. 9 the cell includes housing 70, endcap 72, gasket 74 and clamp 76; output from the cathode and the anode is also indicated.

Four electrodes are provided: An $AB_5$ (BASF) metal hydride anode, a commercial Electric Fuel E4 air cathode (ORR electrode) 22 used only for discharging, a platinized auxiliary electrode (OER electrode) 21 removed from a Nickel Hydrogen cell, and a Hg/HgO reference electrode 50. In addition, there are two diodes 60 connected to the auxiliary and air cathodes. These diodes allow the auxiliary electrode only to operate during charge, and the air electrode only to operate during discharge.

Figure 10:
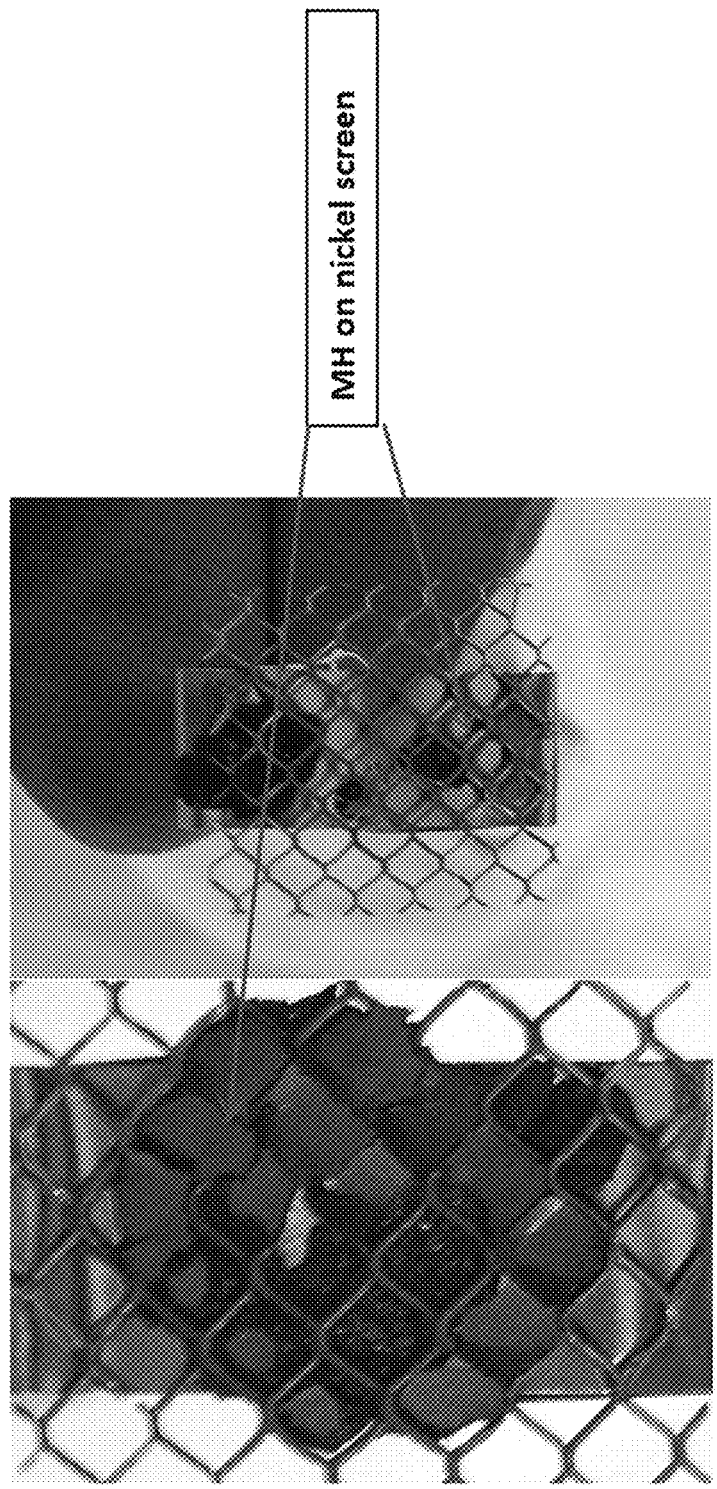
FIG. 10. MH electrode after 1 cycle (left) and 5 cycles (right).

We operated the cell with an electrolyte of 6.5 M KOH. The cell performed well initially, but the performance deteriorated after a few cycles. We noticed that the $AB_5$ electrode was breaking up as shown in FIG. 10. In the left hand photograph, some damage to the surface is already visible. This damage occurs after a single cycle. In the right hand photograph, the metal hydride is almost completely lost.

Figure 11:
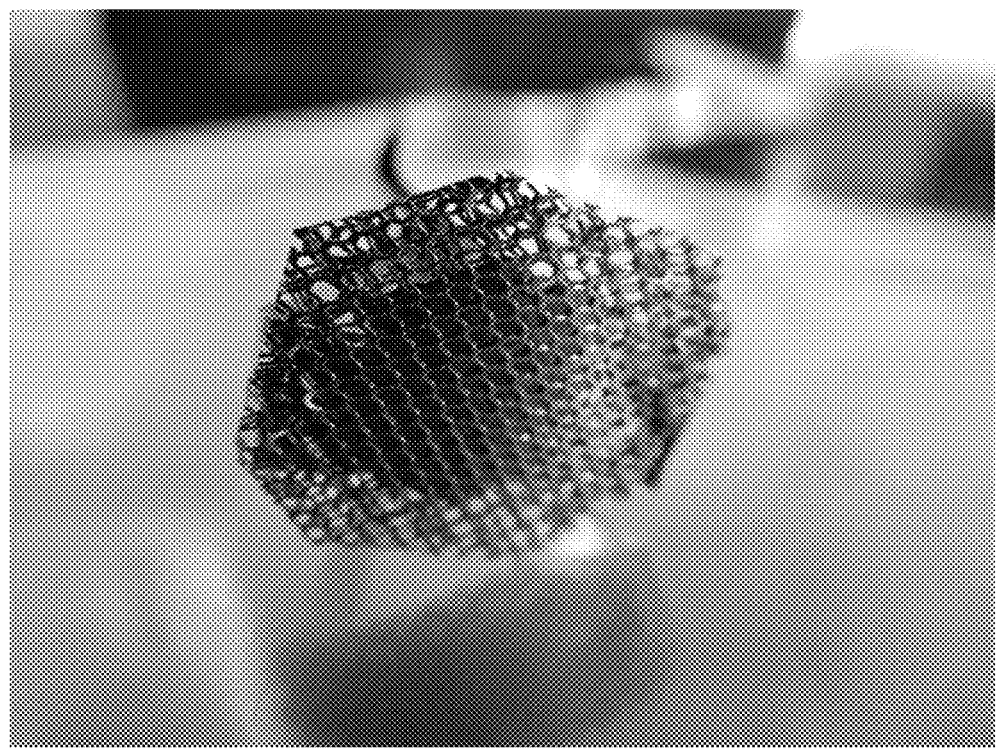
FIG. 11. Metal hydride sandwiched between two Ni screens.

It became quite clear that the electrode in this configuration was not viable. Based on the fact that metal hydrides in commercial rechargeable batteries are constrained in the cell wind, and the lifetime is good in that environment, it was decided to constrain the hydride in our cell. This was done by spot welding a screen over the metal hydride and this is shown below in FIG. 11.

Figure 12:
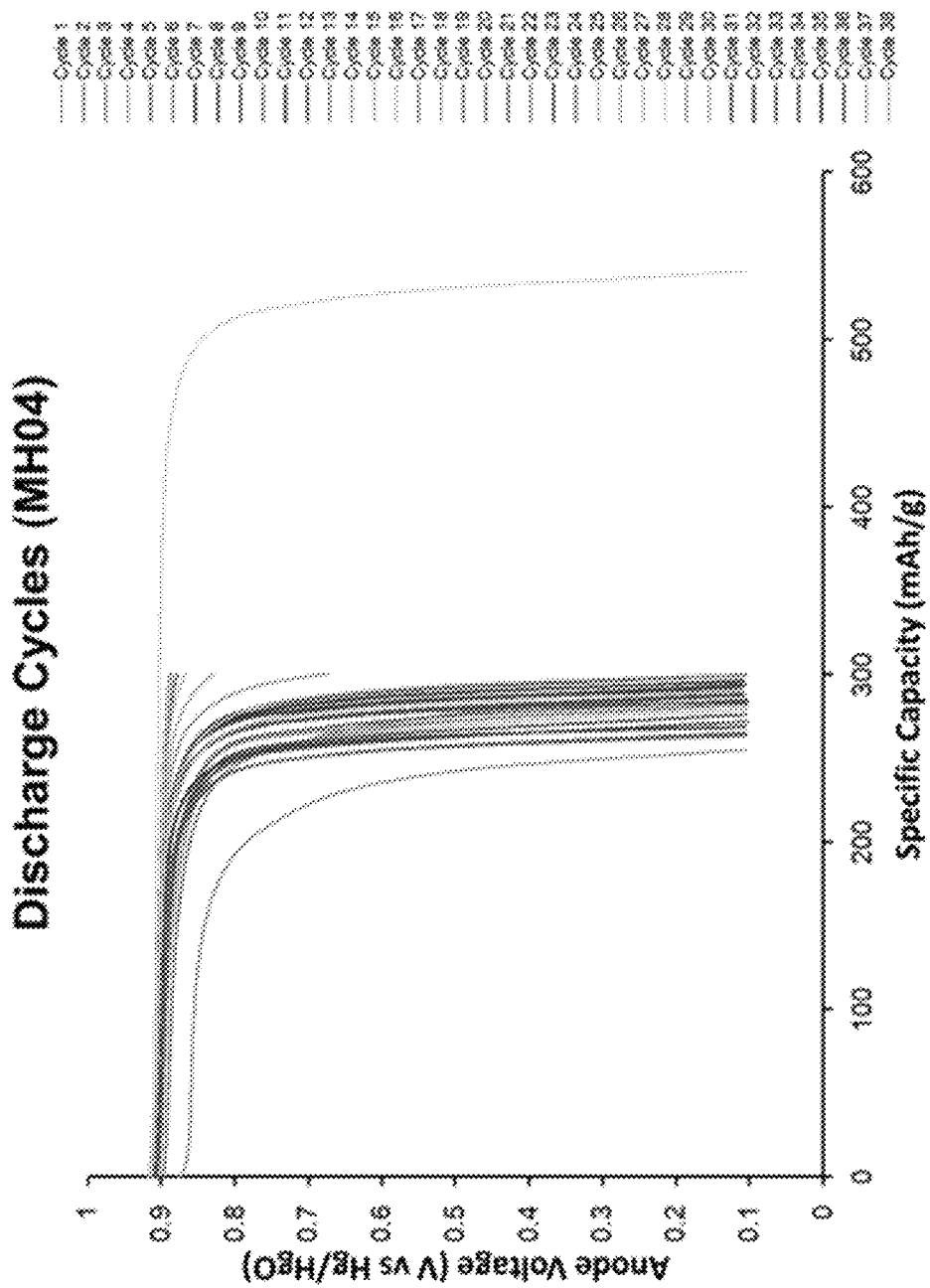
FIG. 12. Anode voltage during 38 sequential discharges.
Figure 13:
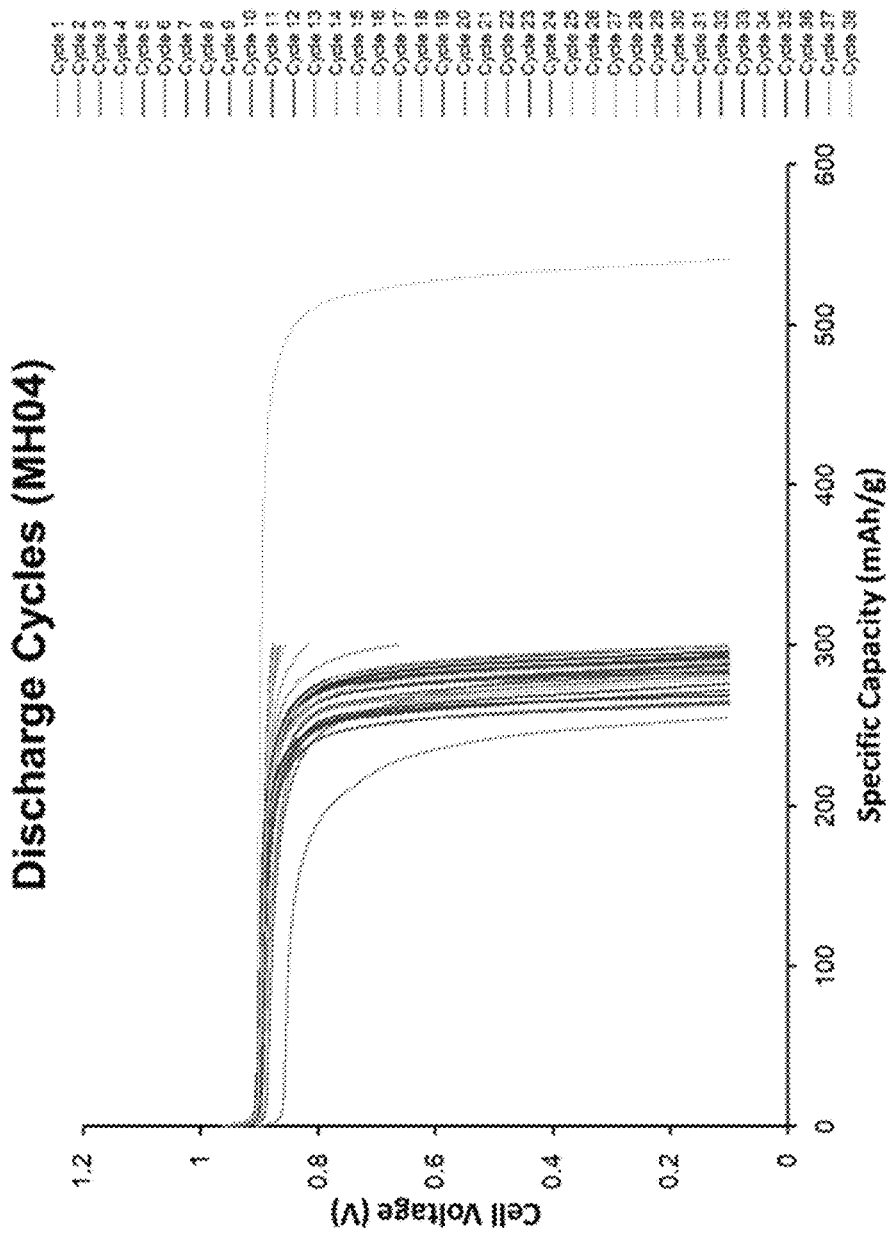
FIG. 13. Cell voltage during 38 sequential discharges.

This approach has been successful. As shown in FIG. 12, we have 55 sequential discharges to date. The cell continues to be cycled at this writing. The anode voltage as measured with respect to the Hg/HgO reference is plotted against the state of charge of the electrode expressed in mAh/gm. This unit is designed to normalize the discharge capacity to what it would be if the anode were 1 gm in weight. The actual weight of the anode is much smaller. Full charge in FIG. 12 is represented by 300 mAh/gm in this case. The one outlier discharge represented by the yellow curve is an artifact generated when the cycler we use was reprogrammed after temporarily halting the experiments and the rest time was erroneously included in the discharge duration. The overall cell voltage is shown in FIG. 13. The overall voltage is quite stable indirectly demonstrating that the cathode is not deteriorating. Also, comparing to the anode voltage, it is clear that the cathode potential must be close to 0 volts. Again, there is an outlier (yellow) curve that is an artifact.

EXAMPLE 5

MH-Bifunctional Air Electrode-NonAEM Separator Test Cell and Test Results

Figure 4:
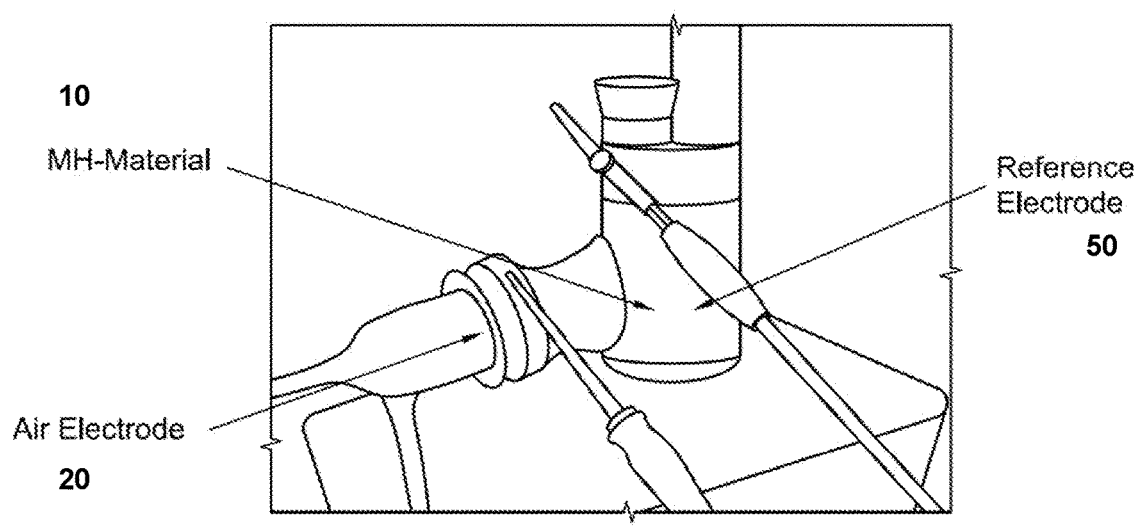
FIG. 4. Three electrode hardware for cell evaluation.

Long cycle life was achieved in a MH-air cell using a bifunctional air electrode fabricated by depositing high surface area catalyst (Pt, in this case) on carbon paper. Cycling was performed in a three electrode cell depicted in FIG. 4 (reference electrode indicated by reference label 50).

Figure 14:
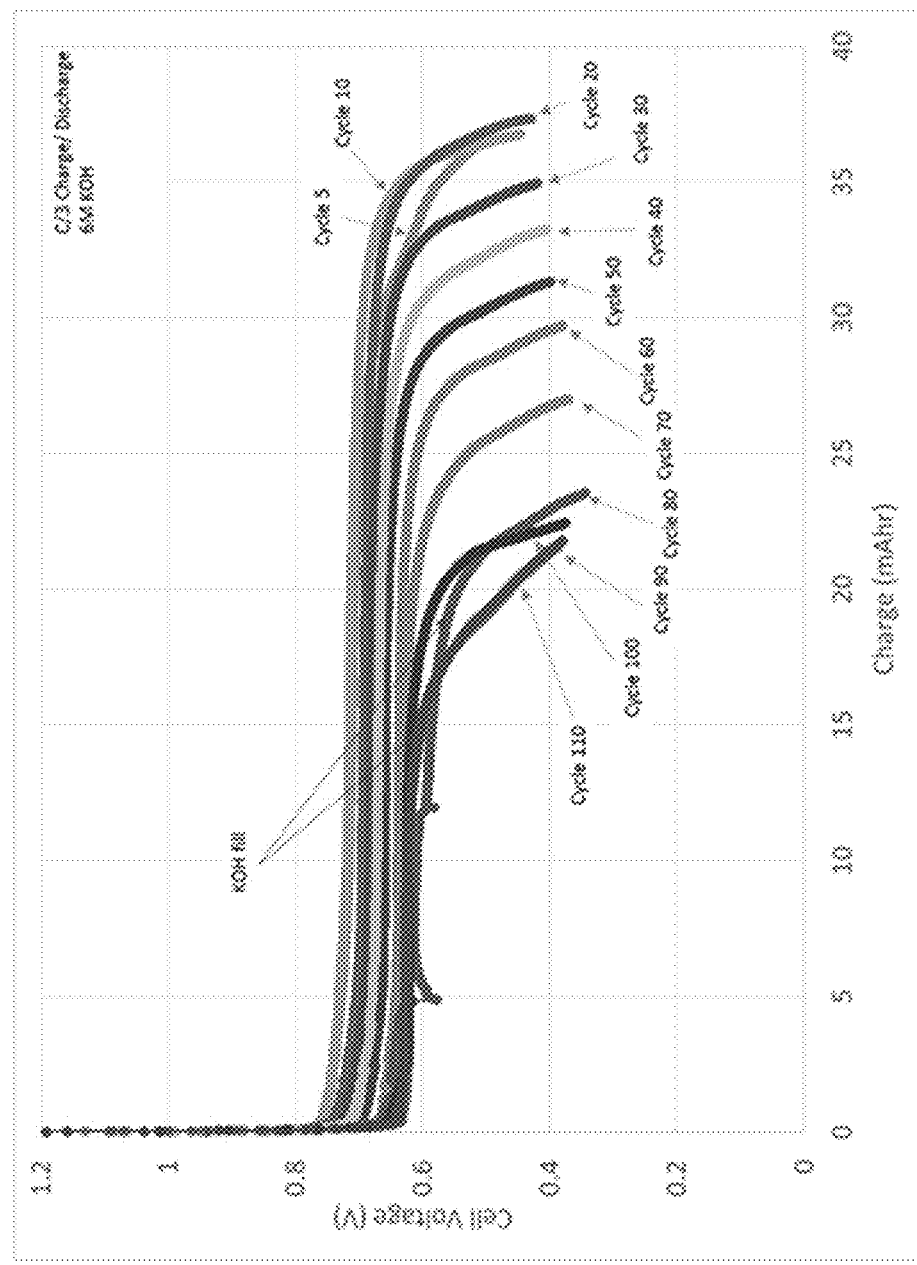
FIG. 14. MH-air cell discharge voltage as a function of charge.
Figure 15A:
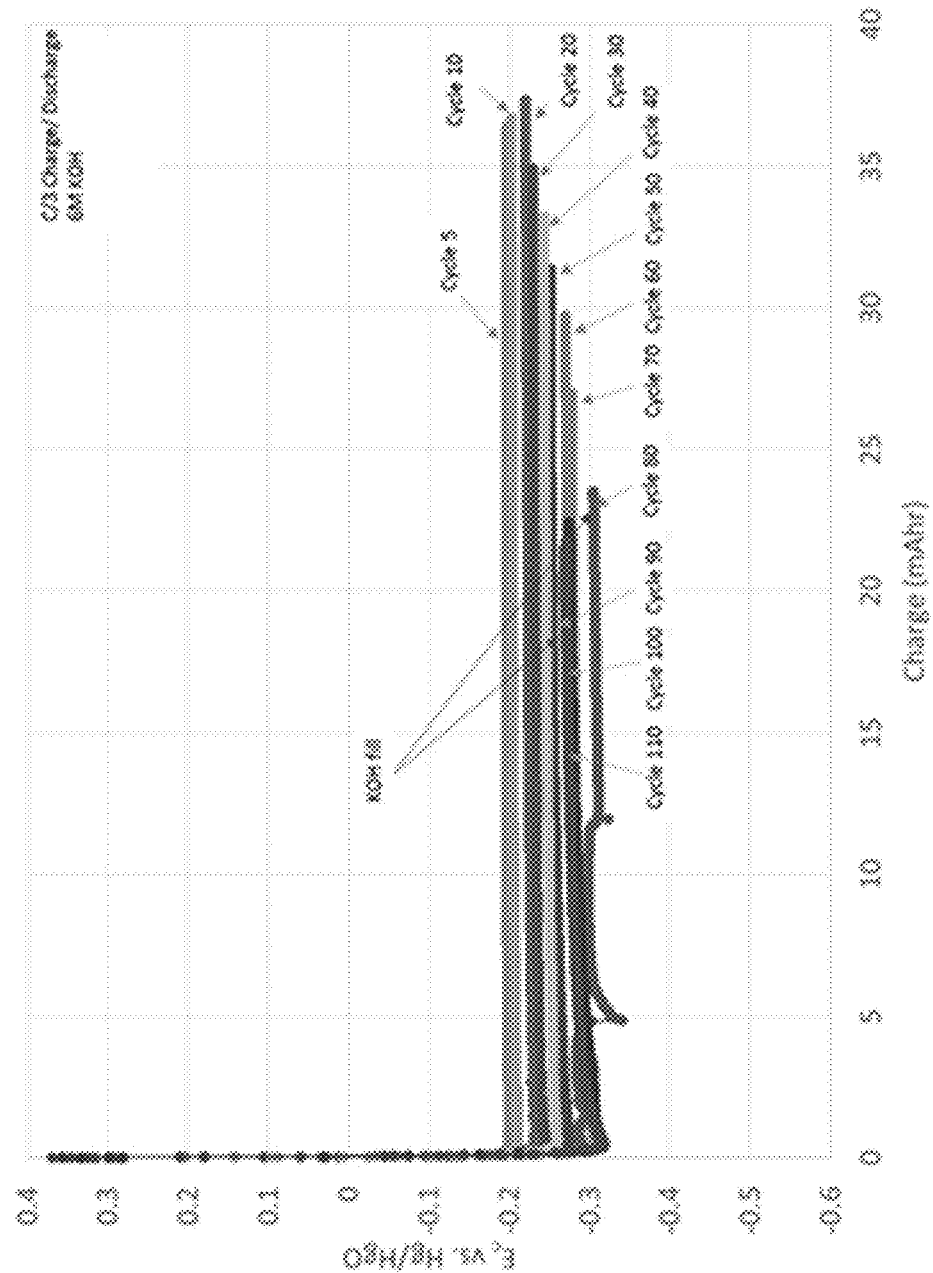
FIGS. 15a-15b. Anode (FIG. 15a) and cathode (FIG. 15b) discharge potential as a function of capacity using bifunctional air electrode.
Figure 15B:
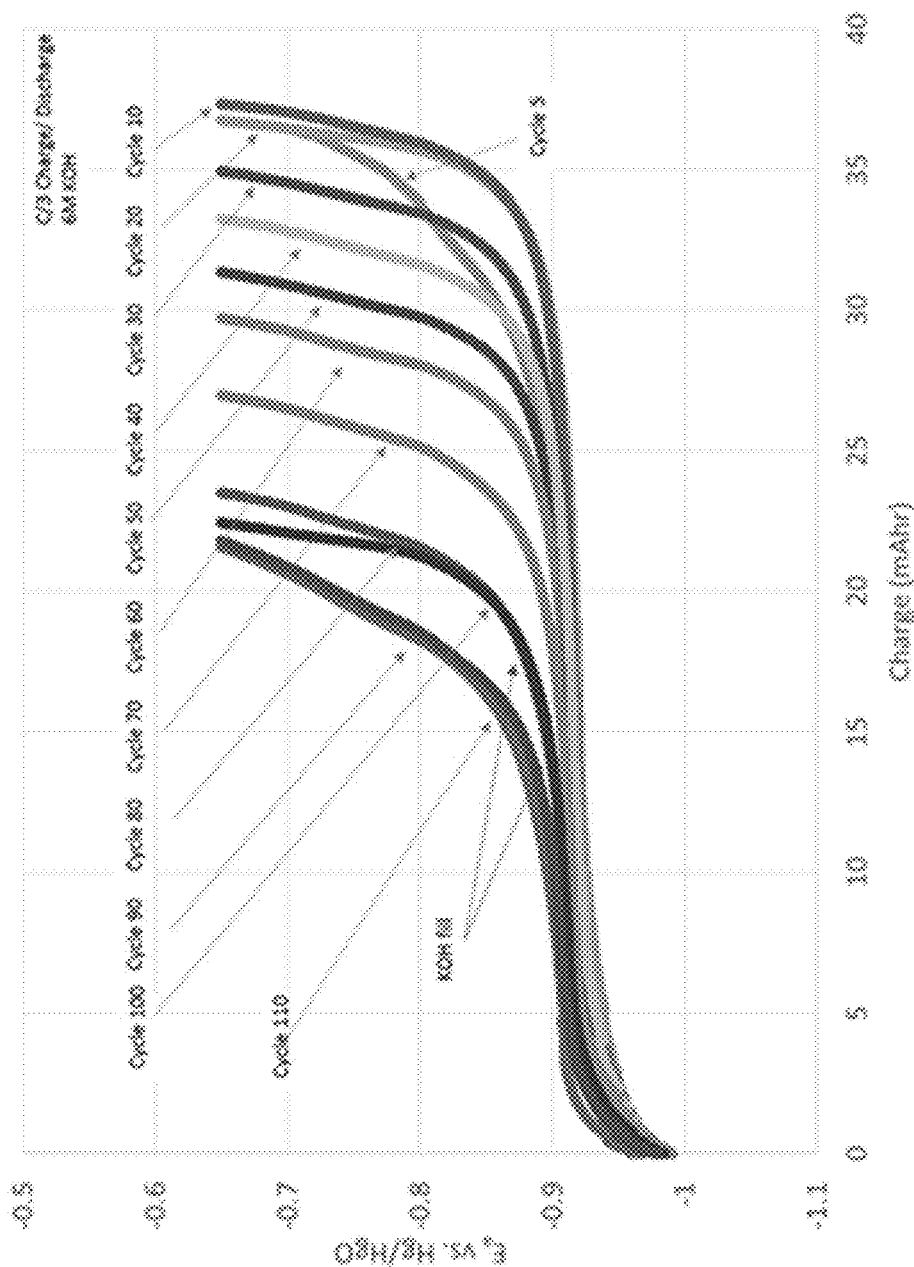

The cell was cycled by charging the metal hydride to 115% capacity at a rate of C/3 and then the metal hydride was discharged at a constant current of C/3 to a potential of −0.65 V versus Hg/HgO. The MH-air cell discharge voltage as a function of capacity is shown is FIG. 14. Cell degradation is noted after 20 cycles. The majority of the degradation is attributed to the metal hydride material as it is not well supported in the cell and as a result sheds off from the electrode. As the metal hydride material sheds, the effective charge rate of the metal hydride is increased as all experiments were kept at constant current. The estimated charge rate of the metal hydride after 110 cycles is approaching C/1.5. During cycling, it was necessary to fill the three electrode cell with electrolyte. The electrolyte fill had the greatest impact on the cell after cycle number 80, were the cell voltage noticeably increased. The effect of cycle number on the anode and cathode potentials are shown in FIG. 15(a) and FIG. 15(b) respectively.

The metal hydride anode used in this experiment was not optimized for operation in this cell configuration. The metal hydride material selected has been shown to cycle well beyond 300 cycles with minimum capacity fade. As shown in FIG. 15a, the metal hydride anode voltage improved with the electrolyte fill, thus showing the importance of hydroxide concentration on MH performance. The focus of the AEM task is to better characterize the air electrode and air electrode/electrolyte interactions. The air electrode potential, operating as a bifunctional electrode, is shown as FIG. 15b.

The potential of the air electrode of the MH-air cell is a function of applied current density. For MH-air cycle at C/3, the current density is approximately 4.8 mA/cm². The air electrode potential is constant over the entire cell discharge range. The cathode potential for cycle number five is −0.197 V versus Hg/HgO. The minimum cathode potential is −0.308 V versus Hg/HgO at cycle number 80, this potential recovered to −0.270 V versus Hg/HgO after the electrolyte fill. The cathode potential will improve with catalyst optimization.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The following definitions are provided to clarify their specific use in the context of the invention.

One skilled in the art readily appreciates that the present invention is well adapted to carry out the objects and obtain the ends and advantages mentioned, as well as those inherent in the present invention. The methods, components, materials and dimensions described herein as currently representative of preferred embodiments are provided as examples and are not intended as limitations on the scope of the invention. Changes therein and other uses which are encompassed within the spirit of the invention will occur to those skilled in the art, are included within the scope of the claims.

Although the description herein contains certain specific information and examples, these should not be construed as limiting the scope of the invention, but as merely providing illustrations of some of the embodiments of the invention. Thus, additional embodiments are within the scope of the invention and within the following claims.

We claim:

1. A metal hydride-air battery comprising:
   a positive electrode, wherein the positive electrode is an air electrode comprising an electrocatalyst, wherein the electrocatalyst is one of an oxygen reduction reaction catalyst and an oxygen evolution catalyst and the battery further comprises a second electrocatalyst, the second electrocatalyst being the other of an oxygen reduction reaction catalyst and an oxygen evolution catalyst;
   a negative electrode, wherein the negative electrode is a hydrogen absorbing material, wherein the hydrogen absorbing material is an intermetallic compound comprising a component A and a component B, wherein component A is selected from the group consisting of La, Ce, Ti, and combinations thereof and B is selected from the group consisting of Ni, Co, Mn, Al and combinations thereof;

an electrolyte provided between said positive electrode and negative electrode, said electrolyte being capable of conducting hydroxide charge carriers; and an alkaline exchange membrane comprising an ionomer polymer electrolyte, wherein said alkaline exchange membrane is chemically stable for an electrolyte pH from 10 to 14, provided between said positive electrode and said negative electrode; wherein said alkaline exchange membrane restricts transport of $O_2$ from said positive electrode to said negative electrode during charging or discharging of said battery, and wherein said positive air electrode, said electrocatalyst, and said alkaline exchange membrane are in physical contact with the alkaline exchange membrane.

2. The metal hydride-air battery of claim 1, wherein said hydrogen absorbing material is an amorphous material.

3. The metal hydride-air battery of claim 1, wherein a source of $O_2$ is provided in contact with said positive electrode and said source of $O_2$ is air.

4. The metal hydride-air battery of claim 1, wherein said alkaline exchange membrane functions as a substrate to support said electrocatalyst of said positive electrode.

5. The metal hydride-air battery of claim 1, wherein said electrolyte is an aqueous alkaline electrolyte.

6. The metal hydride-air battery of claim 5, wherein said aqueous alkaline electrolyte comprises a source of hydroxide ion dissolved in a solvent, said source of hydroxide ion selected from the group consisting of KOH, NaOH, and any combination of these.

7. The metal hydride-air battery of claim 6, wherein said source of hydroxide ion has a concentration in said solvent selected from the range 1M to 6M.

8. The metal hydride-air battery of claim 1 comprising a closed system.

9. A method of generating electrical current, said method comprising:
  providing a metal hydride battery comprising:
    a positive electrode, wherein the positive electrode is an air electrode comprising an electrocatalyst, wherein the electrocatalyst is one of an oxygen reduction reaction catalyst and an oxygen evolution catalyst and the battery further comprises a second electrocatalyst, the second electrocatalyst being the other of an oxygen reduction catalyst and an oxygen evolution catalyst in contact with a source of $O_2$;
    a negative electrode, wherein the negative electrode is a hydrogen absorbing material, wherein the hydrogen absorbing material is an intermetallic compound comprising a component A and a component B, wherein component A is selected from the group consisting of La, Ce, Ti and combinations thereof and B is selected from the group consisting of Ni, Co, Mn, Al and combinations thereof;
    an electrolyte provided between said positive electrode and negative electrode, said electrolyte capable of conducting hydroxide charge carriers; and
    an alkaline exchange membrane comprising an ionomer polymer electrolyte, wherein said alkaline exchange membrane is chemically stable for an electrolyte pH from 10 to 14, provided between said positive electrode and said negative electrode; wherein said alkaline exchange membrane restricts transport of $O_2$ from said positive electrode to said negative electrode during discharging of said battery; and wherein said positive air electrode, said electrocatalyst, and said alkaline exchange membrane are in physical contact with the alkaline exchange membrane; and
  discharging said battery thereby generating electrical current.

10. A method of storing electrical current, said method comprising:
  providing a metal hydride battery comprising:
    a positive electrode, wherein the positive electrode is an air electrode comprising an electrocatalyst, wherein the electrocatalyst is one of an oxygen reduction reaction catalyst and an oxygen evolution catalyst and the battery further comprises a second electrocatalyst, the second electrocatalyst being the other of an oxygen reduction reaction catalyst and an oxygen evolution catalyst;
    a negative electrode, wherein the negative electrode is a hydrogen absorbing material, wherein the hydrogen absorbing material is an intermetallic compound comprising a component A and a component B, wherein component A is selected from the group consisting of La, Ce, Ti and combination thereof and B is selected from the group consisting of Ni, Co, Mn, Al and combinations thereof;
    an electrolyte provided between said positive electrode and negative electrode, said electrolyte capable of conducting hydroxide charge carriers; and
    an alkaline exchange membrane comprising an ionomer polymer electrolyte, wherein said alkaline exchange membrane is chemically stable for anelectrolyte pH from 10 to 14, provided between said positive electrode and said negative electrode; wherein said alkaline exchange membrane restricts transport of $O_2$ from said positive electrode to said negative electrode during charging of said battery; wherein said positive air electrode, said electrocatalyst, and said alkaline exchange membrane are in physical contact with the alkaline exchange membrane; and
  charging said battery by flowing current into said battery thereby storing said current as chemical energy.

11. The metal hydride-air battery of claim 1, wherein component A is a rare earth element and component B is Ni with the general stoichiometry of $AB_5$.

12. The metal hydride-air battery of claim 1, wherein the metal hydride-air battery has a volumetric energy density greater than 300 Whr/l.

13. The metal hydride-air battery of claim 1, wherein the metal hydride-air battery has a gravimetric energy density greater than 150 Whr/kg.

* * * * *